(12) United States Patent  (10) Patent No.: US 9,201,162 B2
Hardegger et al.  (45) Date of Patent: Dec. 1, 2015

(54) OPTICAL UNIT, LIGHT CURTAIN AND METHOD FOR ALLOCATING AN INDIVIDUAL ADDRESS

(71) Applicant: CEDES SAFETY & AUTOMATION AG, Landquart (CH)

(72) Inventors: Martin Hardegger, Sargans (CH); Carl Meinherz, Malans (CH); Christopher Walther, Wolfhalden (CH); Danilo Dorizzi, Klosters (CH)

(73) Assignee: Cedes Safety & Automation AG (CH)

( * ) Notice: Subject to any disclaimer, the term of this patent is extended or adjusted under 35 U.S.C. 154(b) by 0 days.

(21) Appl. No.: 14/260,814

(22) Filed: Apr. 24, 2014

(65) Prior Publication Data

US 2014/0319358 A1 Oct. 30, 2014

(30) Foreign Application Priority Data

Apr. 24, 2013 (EP) ..................................... 13165141

(51) Int. Cl.
*G01V 8/20* (2006.01)
(52) U.S. Cl.
CPC ........................................ *G01V 8/20* (2013.01)
(58) Field of Classification Search
CPC .................................. G01V 8/10; G01V 8/20
USPC ....................................................... 250/349
See application file for complete search history.

(56) References Cited

U.S. PATENT DOCUMENTS

| | | | |
|---|---|---|---|
| 2003/0050735 A1* | 3/2003 | Griffis | 700/255 |
| 2007/0090387 A1* | 4/2007 | Daniels et al. | 257/99 |
| 2010/0127158 A1 | 5/2010 | Scheiber et al. | |
| 2010/0245117 A1 | 9/2010 | Hug et al. | |
| 2011/0176660 A1* | 7/2011 | Morton | 378/57 |

OTHER PUBLICATIONS

European Extended Search Report; Application No. 13165141.6; Dated Jan. 24, 2014—(11) pages.

* cited by examiner

*Primary Examiner* — Marcus Taningco
(74) *Attorney, Agent, or Firm* — Boyle Fredrickson, S.C.

(57) ABSTRACT

The present invention relates to light curtains and, in particular, to safety light curtains for monitoring a protective field and to optical units of such light curtains which comprise optoelectronic components interconnected by a communication bus and to a method for allocating individual addresses to each of a plurality of optoelectronic components. The optical unit comprises a controller unit, a plurality of optoelectronic components interconnected by means of a communication bus, each of said optoelectronic components having a transmission input terminal for receiving a transmission signal and a transmission output terminal for outputting a transmission signal, and a receiving terminal for receiving a control signal from said control unit. An individual address is allocated to each of said optoelectronic components depending on a position of the respective optoelectronic component with respect to the other optoelectronic components.

20 Claims, 22 Drawing Sheets

OPTICAL UNIT, LIGHT CURTAIN AND METHOD FOR ALLOCATING AN INDIVIDUAL ADDRESS

CROSS-REFERENCE TO RELATED APPLICATIONS

This application claims priority to European patent application Ser. No. 13 165 141.6, filed Apr. 24, 2013, the entire contents of which is incorporated herein by reference.

BACKGROUND OF THE INVENTION

The subject matter disclosed herein relates generally to light curtains and, more specifically, to safety light curtains for monitoring a protective field and to such light curtains which comprise optoelectronic components interconnected by a communication bus. Furthermore, the present invention relates to optical units which are part of such a light curtain and to a method for allocating individual addresses to each of a plurality of optoelectronic components.

Generally, light curtains and in particular safety light curtains detect the movement or intrusion of objects into guarded zones, and more particularly, provide protection for human operators who are working with machines or other industrial equipment.

Light curtains employing infrared or visible light beams are used to provide operator safety in a variety of industrial applications. Light curtains typically are employed for operator protection around machinery, such as punch presses, brakes, molding machines, automatic assembly equipment coil winding machinery, robot operation, casting operations and the like. Conventional light curtains typically employ light emitting diodes (LED) mounted at spaced positions along a transmitter bar at one side of the guard zone and phototransistors (PT), photodiodes or photoreceivers mounted along a receiver bar at the opposite side of the zone. The LEDs transmit modulated infrared light beams along separate parallel channels to the PTs at the receiver bar. If one or more beams are blocked from penetration by an opaque object, such as the operator's arm, a control circuit shuts the machine down, prevents the machine from cycling, or otherwise safeguards the area.

Usually, safety light curtains comprise two optical units (also called bars, sticks, edges or strips), which are formed as two different constructional units, one of the optical units having the functionality of an emitter and one of a receiver. This dedicated architecture of an emitter and receiver, however, has several drawbacks.

Firstly, the fabrication costs are high, because each type of optical unit has to be fabricated differently. Further, it is known to use the optical path from the emitter to the receiver also for transmitting information, for instance for a synchronization. However, in a system where one of the optical units has only the function of an emitter and the other one only the function of a receiver, the optical communication is only unidirectional, i.e. from the sender side to the receiver side. Therefore the optical synchronization may be difficult and a transmission of communication information is possible only in one direction.

It has already been proposed to locate receivers and transmitters on each of the first and second optical units, as this is described in the European patent EP 1870734 B1. Here, the grid has two identical transmitting/receiving strips, to which transmitting and receiving units are fixed. The transmitting/receiving strips are placed opposite to each other with a protective field being formed between the strips. The transmitting/receiving strips are identically formed in control and evaluation units. The control and evaluation units have safety outputs, which are formed together as a switching channel. An identical power supply is provided for all the strips.

Furthermore, it is known from EP 2511737 A1 to provide a modular light curtain and optical unit for such a light curtain.

Whenever electronic components are interconnected by means of communication bus, it is necessary that each of the components has a clearly distinguishable individual address which is also known to the controller for providing data intended for the particular electronic component in the downlink and for distinguishing between the data sent by a particular component in the uplink. When assembling light curtains containing a plurality of optoelectronic components each may be provided with a particular address which is stored in the controller and the optoelectronic component itself, so that the communication can take place. The address value is normally pre-defined and correlated with a particular function within the bus system and such a pre-defined address allocation has the disadvantage that this particular function of a component within the bus has to be known before assembly. In the case of light curtains having optoelectronic components with sender and/or receiver elements this means that during assembly each optoelectronic component has to be mounted in a pre-defined assembly location corresponding to its address.

Thus, it would be desirable to provide a light curtain and a method for allocating an individual address to each of a plurality of optoelectronic components, which reduces the expenditure during assembly and also complies with the requirements for a design for testability and maintenance.

BRIEF DESCRIPTION OF THE INVENTION

The subject matter disclosed herein describes a method for allocating an individual address to each of a plurality of optoelectronic components in a light curtain, which reduces the expenditure during assembly and also complies with the requirements for a design for testability and maintenance.

The present invention is based on the idea that the optoelectronic components are not provided with a pre-set address by the manufacturer, but are allocated their address depending on a geometric position of the respective optoelectronic component with respect to other optoelectronic components within a light curtain. In particular, setting up a light curtain for the first time may initiate an address distribution by daisy chain addressing and the optoelectronic modules are connected to each other for the address distribution in a serial interconnection scheme. By such a dynamic on-site address allocation a much higher flexibility and an improved adaptation to particular data structures which are necessary on-site during operation, is feasible. Furthermore, retrofitting and repair of the light curtain system is facilitated. Using a daisy chain addressing allows an easy correlation of the geometric position of the optoelectronic components in respect to each other, if they are aligned in some linear configuration. For covering matrix-shaped arrays, a meandering daisy chain address line can be used for allocating the addresses of the individual optoelectronic components.

The address allocation according to the present invention can be used to full capacity by employing it together with a light curtain having emitters emitting infrared radiation (with a wavelength between 750 nm and 1500 nm) or visible light (having wavelength between 400 nm and 750 nm).

According to the present invention, each of the optoelectronic components comprises an electronic circuit for driving the at least one light-emitting element and for processing signals generated by the at least one light-receiving element. This arrangement has the advantage of providing a highly modular setup and allows for a highly flexible and cost-effective assembly of the optical unit and resulting light curtains.

For storing the allocated address, the optoelectronic components each comprise a permanent or volatile memory. If the storing means permanently stores the allocated addresses, the address allocation procedure only has to be performed when a setup of the light curtain is initialized. This may be the case for the first installation, but also when re-arranging the optical units or after maintenance works. However, the address may also be stored in a volatile memory and always be newly allocated during the power-up process. The optical units according to the present invention may either be combined with just a reflective surface or with at least one second optical unit of the same kind to form a light curtain for monitoring a protective field.

The present invention furthermore relates to a method for allocating an individual address to each of a plurality of optoelectronic components connected to each other via a communication bus. According to this method, a control unit broadcasts a request to all optoelectronic components within the setup in a first communication direction. Each of the optoelectronic components then transmits an individual response in a second communication direction. Depending on the position of the respective optoelectronic component with respect to the other optoelectronic components, an individual address is allocated to each of them. This method of assigning individual and unique addresses to the optoelectronic components allows for a high flexibility and cost-effective setup of the complete system.

According to the present invention, at least the signal line that is used as an address line is formed as a serial connection in order to provide a daisy chain addressing scheme. The daisy chaining allows for a particularly simple determination of the positions of the optoelectronic components with respect to each other. In addition to the addressing connection, the controller may also have the possibility to access every single optoelectronic component randomly by means of a data bus with a node address. There are at least two options because the bus connection and the daisy chain do not necessarily have to be formed by the same structure. The bus system may have three lines, in particular clock, data-in and data-out, and one of them forms the daisy chain. In particular, either the data-in line or the data-out line is a serial connection and the others are parallel. On the other hand, the bus system may also have three lines (clock, data-in and data-out) and an additional daisy chain connection is provided for distributing the addresses which does not form part of the bus connection, but is only used during setup for an address distribution.

Serial connections generally have an impact on signals passed along them in that the signal gets delayed compared to those signals that do not pass through the daisy chained component, e.g. a clock signal. In order to allow for a defined re-synchronization with those signals that are transmitted bypassing the serial connection, the system may comprise one or more delay elements for delaying, signals transmitted on said serial interconnection. These delay elements can provide a buffer function and allow for a re-synchronization of the daisy chained signal with e.g. the clock signal.

For allocating the individual address depending on the position of the optoelectronic components in respect to each other, there are mainly two possible procedures. Firstly, the address is given by the controller as a new data word and stored in the memory of the optoelectronic component.

Alternatively, also an already present unique identifier of the optoelectronic component can be read out and can be assigned the meaning of a particular address, depending on the position of the respective optoelectronic component. For this procedure, during the startup, an individual and unique identifier of each optoelectronic component is read out and set into relation with the physical position in the bus. This relation is stored in the control unit, again either permanently or volatile. There are different options for this individual and unique identifier. In particular, a unique identifier may be given during semiconductor fabrication and assembly of the optoelectronic component. Alternatively, the unique identifier may also be assigned during the module production in the production site or during the light curtain production in a configuration cell or at the OEM customer's premises. In any case, no manipulation of the stored data in the memory of the optoelectronic components has to be performed, but still the identifier stored within the optoelectronic component does not in itself have to contain the meaning and information of a particular address.

Due to safety reasons, for answers from the optoelectronic component to the microcontroller, the inverted node address can be used as a node identifier. The result is that the microcontroller communicates to each of the optoelectronic components using their unique node address, whereas when the optoelectronic components need to transmit data to the microcontroller, the node identifier. i.e. the inverted node address, is used.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
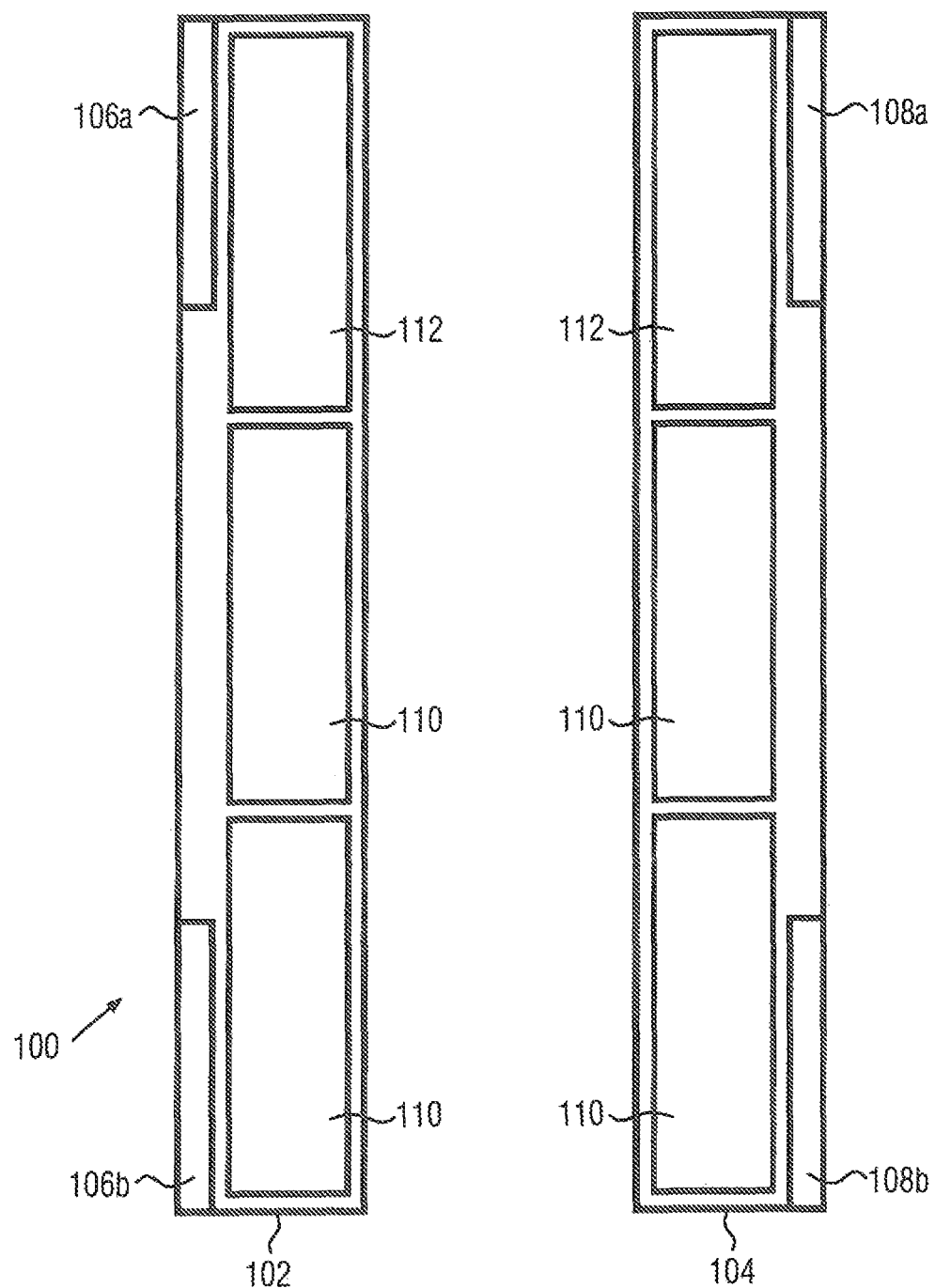
FIG. 1 shows a schematic representation of a light curtain having two optical units.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

Referring now to FIG. 1, a schematic representation of a light curtain comprising two optical units is shown.

The light curtain 100 in this embodiment consists of two identical first and second optical units 102, 104, which form between each other a plurality of light barriers for monitoring a protective field. However, the ideas of the present invention are also applicable to arrangements, where only one optical unit 102 is used together with a reflective opposing surface or in systems which comprise more than two optical units. The optical units 102, 104 may for instance be formed according to the principles of the European patent application EP 2511737 A1, and may in particular use plug-in modules 106, 108 for defining their respective functionality.

According to the embodiment shown in FIG. 1, each optical unit 102, 104 comprises two preferably identical modules 110 each having light emitting and light receiving elements.

These optical modules 110 may be identically built for both optical units 102, 104. Each of the optical units 102, 104 further comprises at least one second optical module 112 that also comprises a microcontroller providing the necessary intelligence to the optical unit 102, 104. Each of the modules 110, 112 may for instance have a height of about 150 mm. However, any other size or number of modules within each optical unit 102, 104 can also be used together with the present invention. As shown in FIG. 1 the first and second optical unit 102, 104 may be identically built except for the plug-in modules 106a, 106b and 108a, 108b which are defining the particular functionality of each of the optical units. However, as will become more apparent when referring to FIGS. 2 to 5, the optical modules do not necessarily have to be identical for each of the optical units, but can differ in that one of the optical units has modules comprising only emitters, whereas the other has modules with only receivers.

Each of the optical modules 110 comprises a plurality of optoelectronic components with their associated circuitry for emitting and sensing the radiation beams. The second optical module 112 contains the same optical functions and additionally, at least one microcontroller and optionally electronic circuitry, such as an interface with an external connector. However, for using an addressing according to the present invention, the optoelectronic components do not necessarily have to be grouped in optical modules 110, 112.

Figure 2:
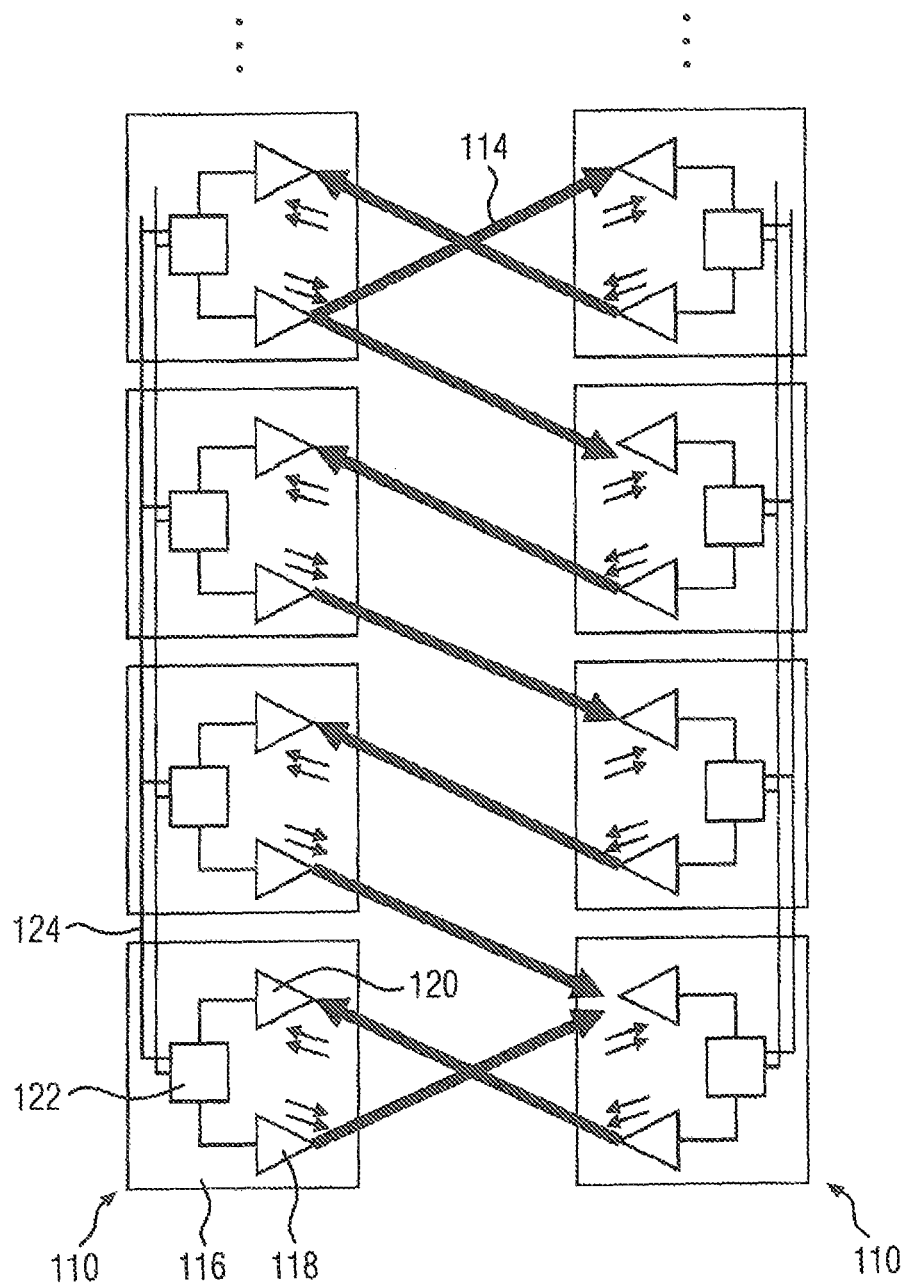
FIG. 2 shows a schematic representation of a light curtain comprising two optical units according to a first embodiment.

A more detailed view of a part of two opposing optical modules 110 is given with reference to FIG. 2. The light curtain may be formed by a linear array of radiation beams 114 which can either be infrared radiation with a wavelength between about 750 nm and 1500 nm, or visible light having a wavelength between about 400 nm and 750 nm.

The radiation beams 114 may for instance be activated sequentially, one beam at a time, from one peripheral end to the other peripheral end of each stick. Because each optical unit 102, 104 has transmitting and sensing photo elements, the scan through the light curtain activates every element sequentially and with an alternating direction, the beam being sent from the second optical unit 104 to the first optical unit 102 and back again. During such a scan sequence, the respective receiving stick always only sequentially detects the light from the pre-determined emitting element to the corresponding receiving element. In order to allow for such a complex scan procedure, each optical unit 102, 104 is formed by a plurality of optoelectronic components 116 each comprising at least one light-emitting element 118 and at least one light-receiving element 120.

Each of the optoelectronic components 116 has a rather high degree of integrated intelligence in the form of a separate control element 122 which may for instance be formed as an integrated circuit, such as an application specific integrated circuit (ASIC). Each of the control elements 122 provides electronic circuitry for driving the at least one light-emitting element 118 and for processing signals generated by the at least one light-receiving element 120. In order to communicate with the higher level controller, each of the optoelectronic components 116 is connected to a communication bus 124.

Figure 4:
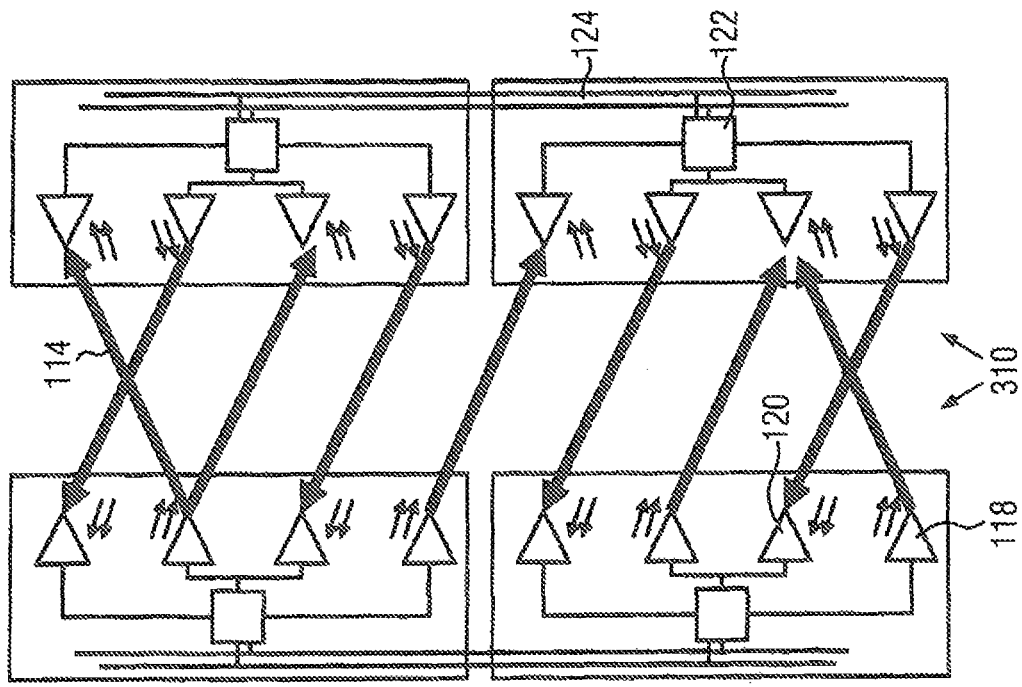
FIG. 4 shows a schematic representation of a light curtain comprising two optical units according to another embodiment.
Figure 3:
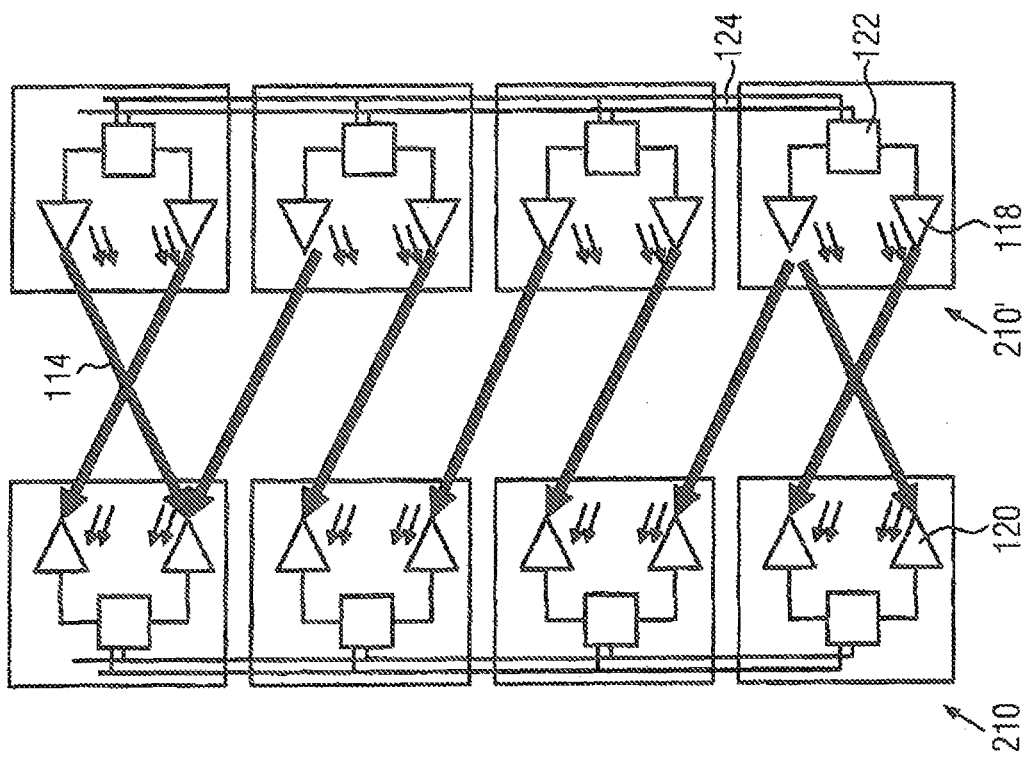
FIG. 3 shows a schematic representation of a light curtain comprising two optical units according to another embodiment.
Figure 5:
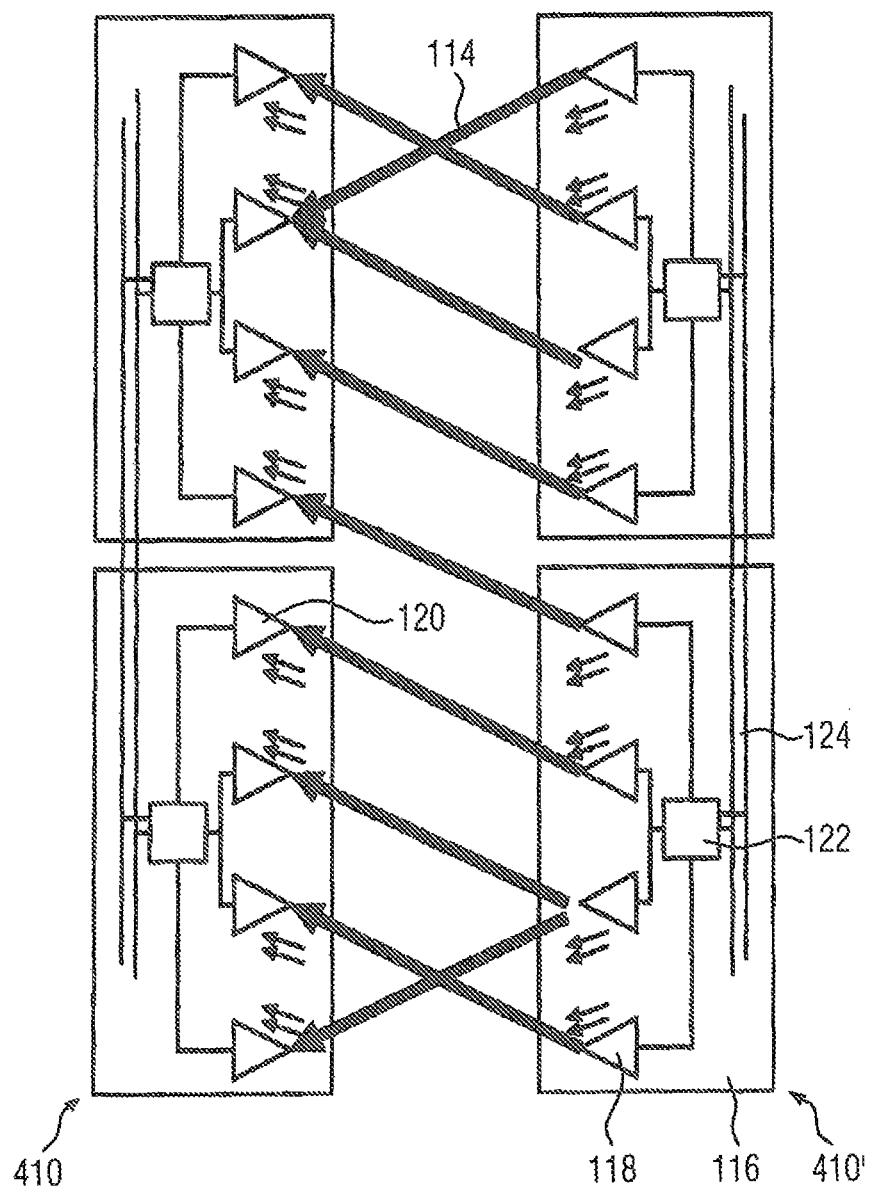
FIG. 5 shows a schematic representation of a light curtain comprising two optical units according to another embodiment.

Alternative architectures which can also be advantageously used with the addressing scheme according to the present invention are depicted in FIGS. 3, 4 and 5. Firstly, as shown in FIG. 3, the present invention can also be employed with systems that are optically unidirectional in that one of the optical units (reference numeral 210) only comprises optical senders and the other optical unit 210' comprises only receivers. Furthermore, as shown for the optical units 310 and 410, 410' in FIGS. 4 and 5, each control unit 122 can be assigned to at least two emitters and/or receivers. Again, FIG. 5 illustrates the optically unidirectional architecture.

In order to provide the complex control scheme to each of the optoelectronic components 116, it is required that they have an individual address which is also indicative of their position within the light curtain 100. According to the present invention, this is achieved by allocating the addresses after assembling and interconnecting the optoelectronic components 116 to form an optical unit 102, 104.

Figure 6:
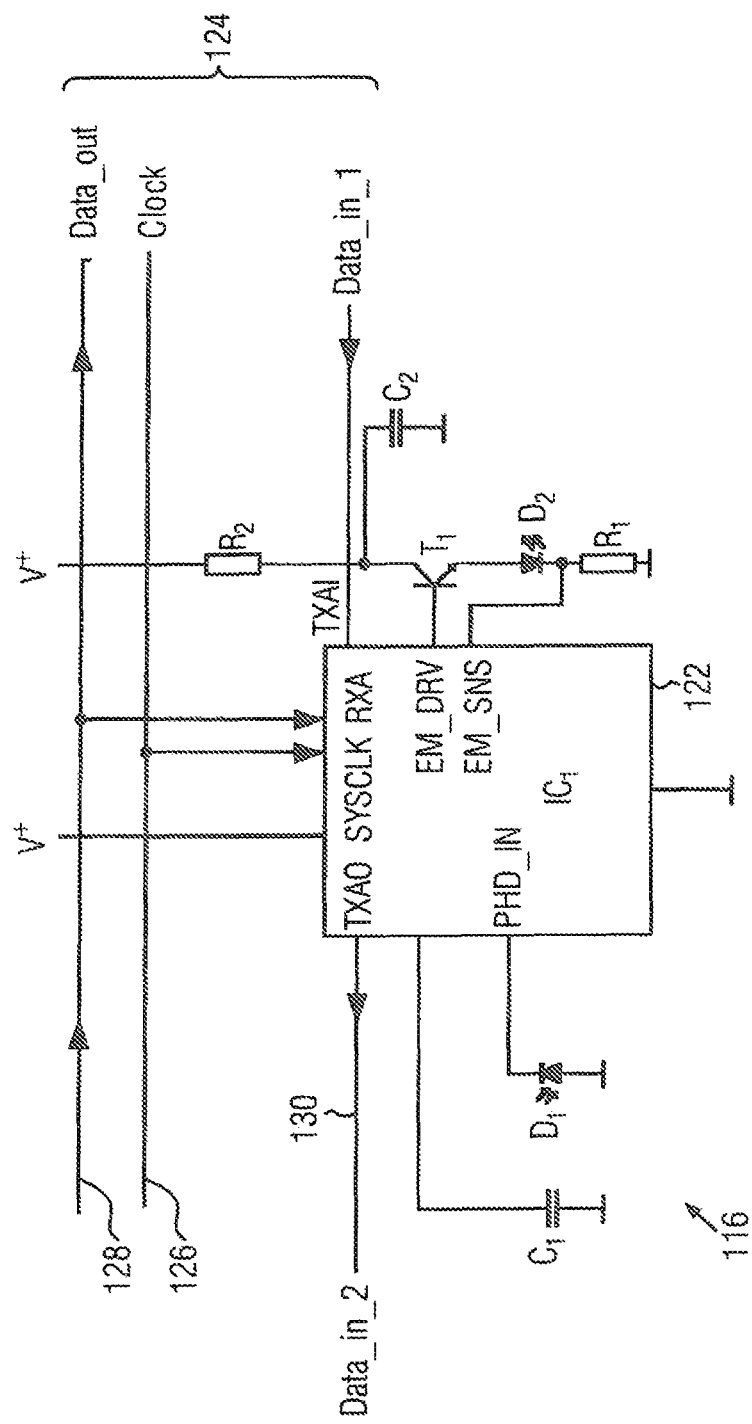
FIG. 6 shows circuit diagram of an optoelectronic component according to one embodiment of the present invention.

FIG. 6 shows in a schematic representation one optoelectronic component 116 with its interconnection terminals and the control element 122. In particular, the optoelectronic component 116 comprises a light-emitting element, in particular a light-emitting diode, LED, D2, and a light-receiving element, in particular photo diode D1. According to the present invention, the control element 122 is connected via a communication bus 124 to the next following optoelectronic component or, in case that it is the one next to the controller of the optical unit, to the controller. The bus comprises a data-out line which transports signals from the microcontroller (the master of the system) to the control element 122. According to the embodiment shown in FIG. 6, the communication bus 124 between the microcontroller functioning as the master and the plurality of control elements 122 is a combined serial and parallel bus based on three communication lines: a clock; a data-in line and a data-out line. The global system clock 126 is controlled by the master. This clock is buffered on each control element 122 and provides the main clock for the functioning of the control element 122.

The data transmission line (data-out) is configured as a single bit unidirectional connection from the microcontroller to the control elements 122. In particular, the data-out line is a shared communication line out of the microcontroller to all of the control elements 122. In other words, all control elements 122 are connected in parallel and the transmission line is buffered on each module if the plurality of optoelectronic components is grouped together in optical modules 110.

The data-in line 130 is another single bit unidirectional line for receiving data which is sent from the control elements 122 to the master. According to the embodiment shown in FIG. 6, the data-in line 130 is a daisy chain line which is passed on from one control element 122 to the next. During normal operation, the control element receives data from the neighboring control element. An arrow gives the signal flow for this operation. On the following clock cycle the data are propagated to the next control element 122. During the address allocation operation, the pins that are connected to the data-in line 130 have the modified functionality of an enable input and an enable output. As this will be explained in more detail later, the communication direction is maintained, but the function of the pins has changed in order to enable the address allocation sequence.

Generally, every communication is initiated by the microcontroller which acts as the bus master. A particular control element 122 may only transmit information onto the data-in line 130 after a request originated by the microcontroller has been recognized and validated. The response onto the data-in line 130 must then follow the particular bus protocol. Moreover, the communication line from the control elements 122 to the microcontroller is a point-to-point communication bus which is synchronous to the single global system clock. That means that each control element 122 takes information from the previous control element and forwards the merged results of that data and its internal data to the next control element. With a configurable option to register the data in a flip flop and send it on the following clock.

Each control element 122 is connected to a single power line (V+) which may for instance be a 12 V to 15 V power line. The control element 122 may also comprise internal power management blocks for regulating its own power supply.

The main functions of the optoelectronic component 116 lie in sensing and emitting pulsed radiation in a controlled manner under the supervision of a microcontroller.

The photodiode D1 senses radiation, and in particular light, coming from the opposing optical unit and generates an analog input signal which is connected to a receiving amplifier integrated into the control element 122. For a person skilled in the art, it is understood that also more than one photodiode can be provided.

Furthermore, the control element 122 controls an LED drive circuit so that the LED D2 emits a radiation beam to the opposing optical unit. The drive circuit is controlled by the control element 122 in a way that the emitted light intensity has a specified level. Also, more than one light-emitting diode D2 may be provided in the circuit according to FIG. 6. As already set forth above, the control element 122 is operable to communicate with the microcontroller over two communication lines. The communication line from the microcontroller to the control element 122 is a shared communication. All control elements in one module are connected in parallel with a digital buffer isolating each of the modules.

For instance, according to a typical implementation, an optical module 110 may have eight or nine optoelectronic components 116.

For regulating the driver transistor T1 of the diode D2 a sensing input is provided for sensing the emitted current of the light emitting diode D2.

Figure 7:
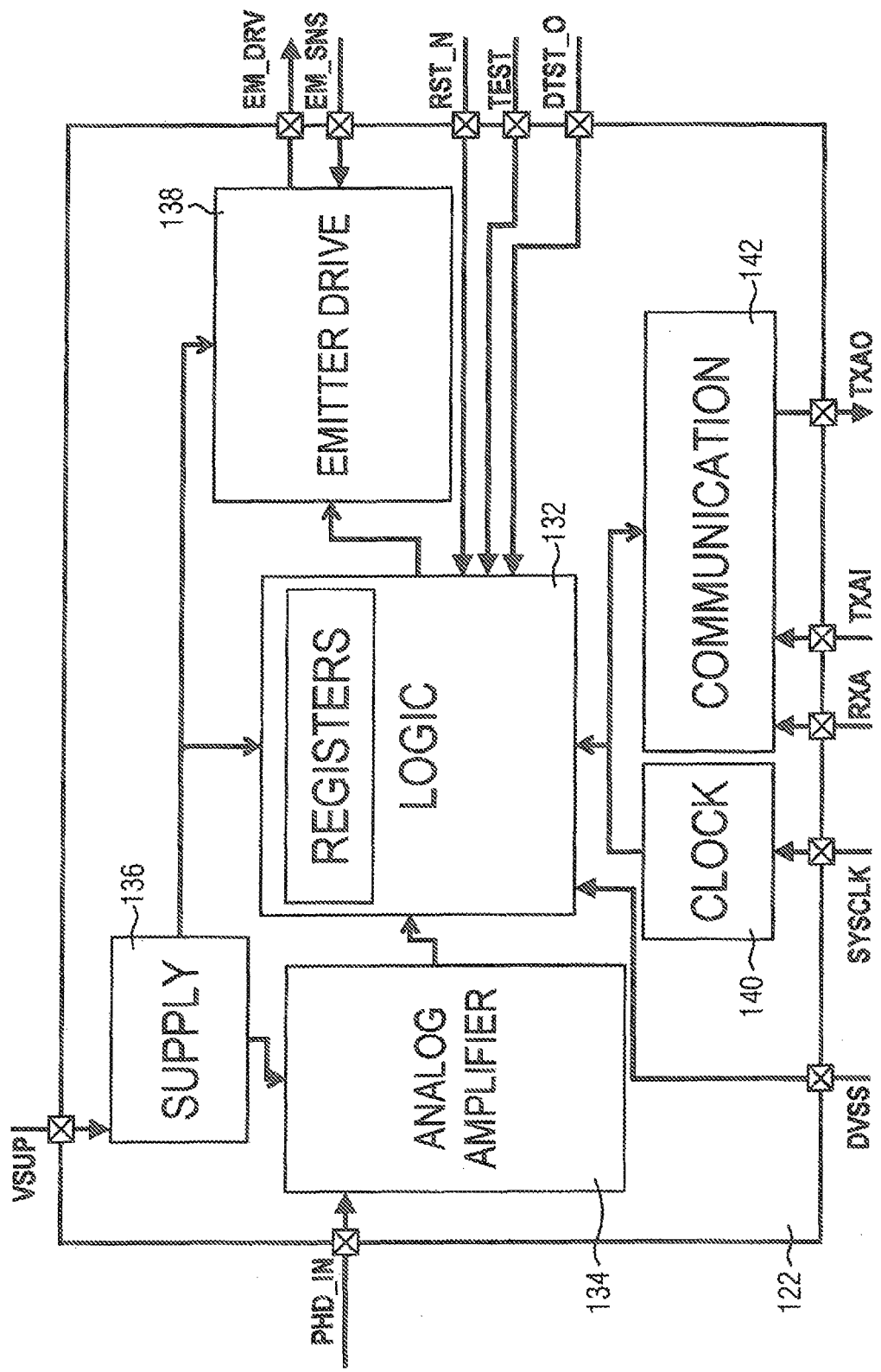
FIG. 7 shows a block diagram of a control element which is part of the optoelectronic component.

FIG. 7 shows a schematic block diagram of the control element 122 according to FIG. 6. As already mentioned above, the control element 122 may be formed by an integrated circuit and may in particular be realized in the form of an application specific integrated circuit, an ASIC, or a field programmable gate array design (FPGA). ASICs have the advantage of a full-custom capability, lower unit costs and a small form factor, whereas FPGAs have the advantage of a faster time to market and a simpler design cycle. In the following, the control element will often be called "ASIC". However, this does not restrict the control elements only to ASICs.

The control element 112 has analog and digital sections as well as interfacing cells. The analog amplifier 134 is operable to detect the signals measured by the photodiode. Furthermore, the logic section 132 contains the registers which are used for storing the address of the particular control element 122. The clock 140 is used to synchronize all control elements with the microcontroller, run the internal logic, and sample the communication bus starter lines. The internal LED control 138 controls the LED current value by measuring the voltage across the external resistor R1 shown in FIG. 6.

The power supply block 136 generates the voltage for supplying the internal circuitry, such as the digital logic supply and the analog supply. Auxiliary voltages for the bias of the photodiode and the analog ground reference may also be generated here.

The communication block 142 interfaces on one side with the external microcontroller serial bus 124, as shown in FIG. 6, and on the other side with the internal logic 132.

Figure 8:
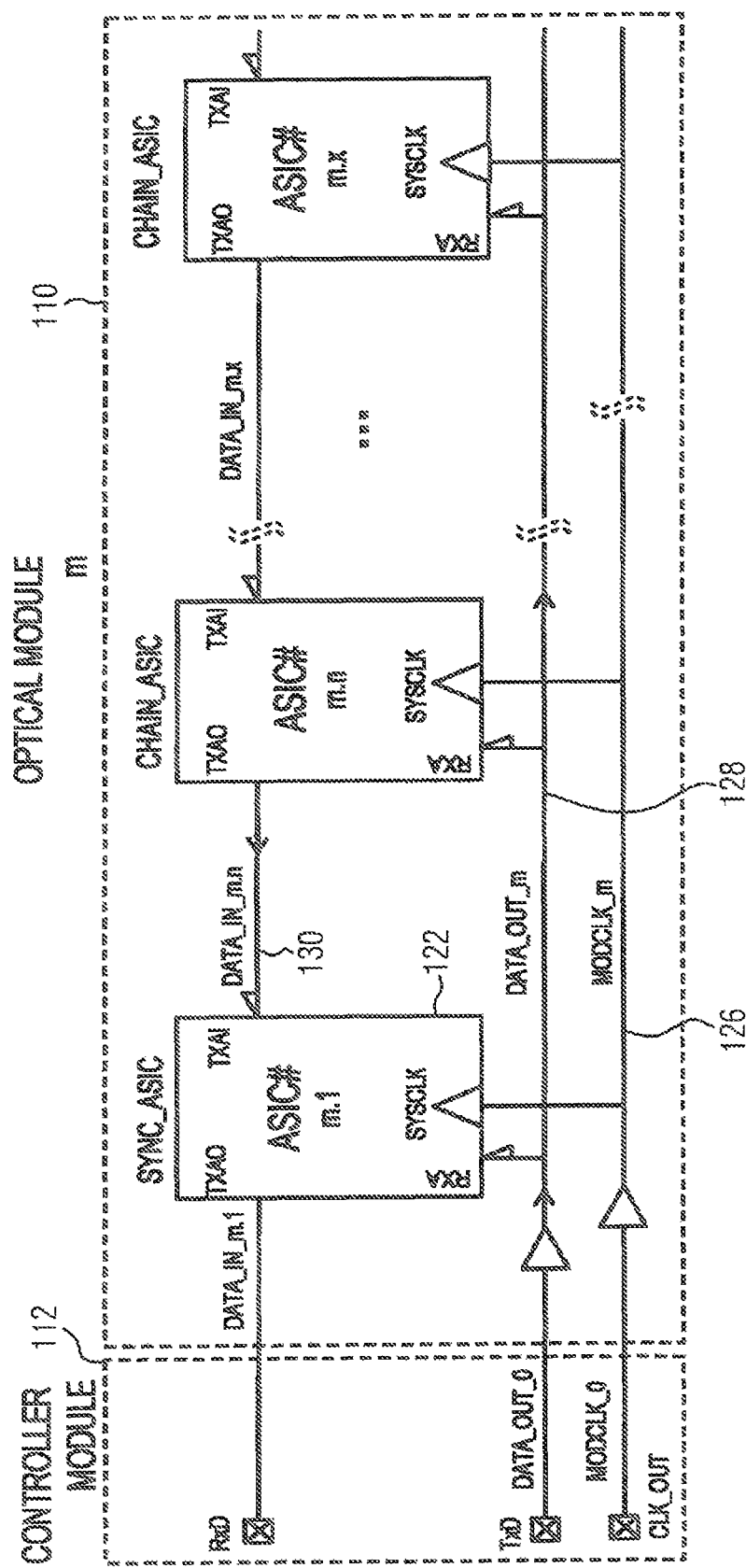
FIG. 8 shows a schematic representation of an optical unit according to one embodiment of the present invention.

With respect to FIG. 8, the communication between a particular optical module 110 and the controller module 112 is illustrated. In this figure as well as in the following figure the particular embodiment of using an ASIC as the control element 122 is considered. However, as outlined above, any other suitable technique for realizing a control element 122 can be employed here as well.

In order to allow that the ASICs are operated in such a multiple ASIC system, each ASIC is assigned a unique identifying address which is stored in a bank of registers, and the ASICs respond to system commands via a shared serial bus. In response to the commands, the ASIC replies via a shared single-bit serial bus with an arbitration mechanism.

Furthermore, the plurality of ASICs is interconnected by means of at least one serial daisy chain line which in the embodiment shown in FIGS. 6 and 5 is provided by the data-in bus communication line 130.

Figure 9:
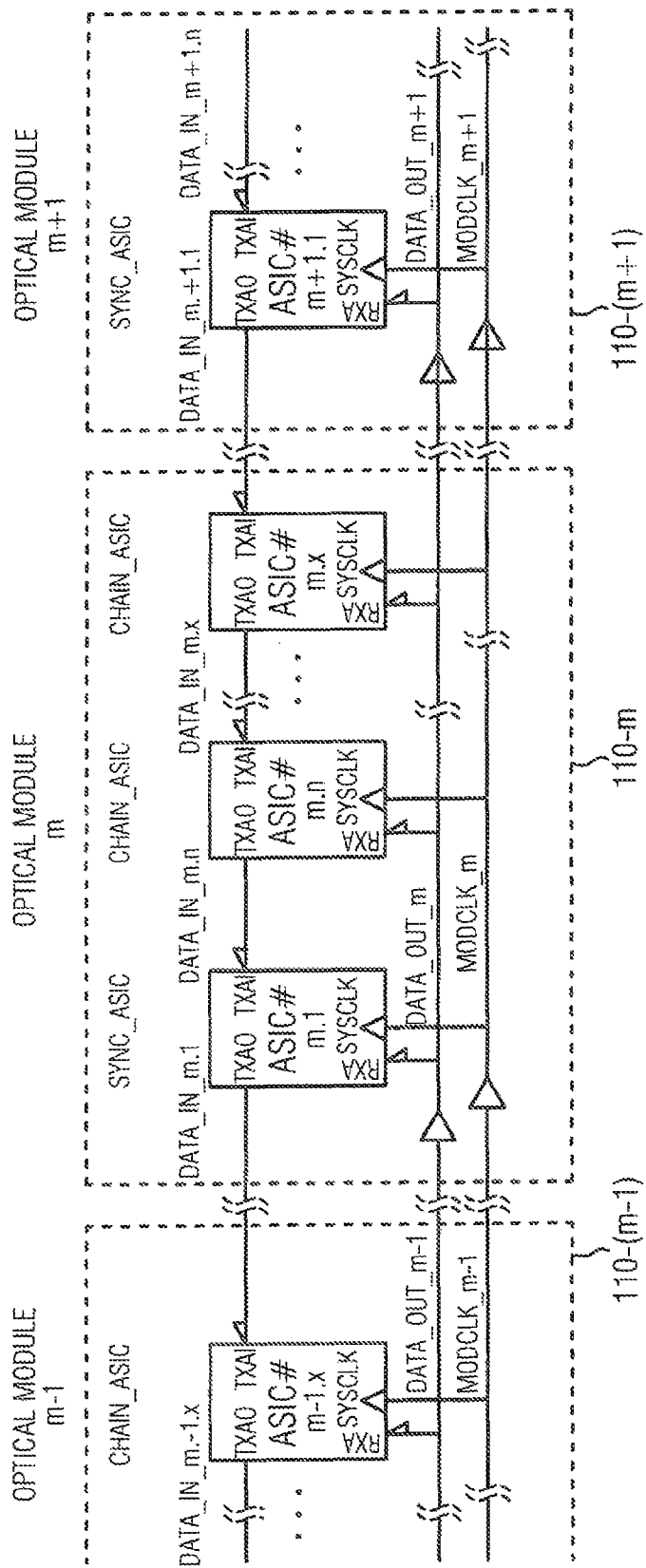
FIG. 9 shows a schematic representation of an optical unit according to a further embodiment.

FIG. 9 shows the case where a plurality of optical modules 110 is provided instead of the single optical module shown in FIG. 8. The principles of the present invention may be employed for the embodiment shown in FIG. 6 in the same way as for a case where only one module 110 is present.

Figure 10:
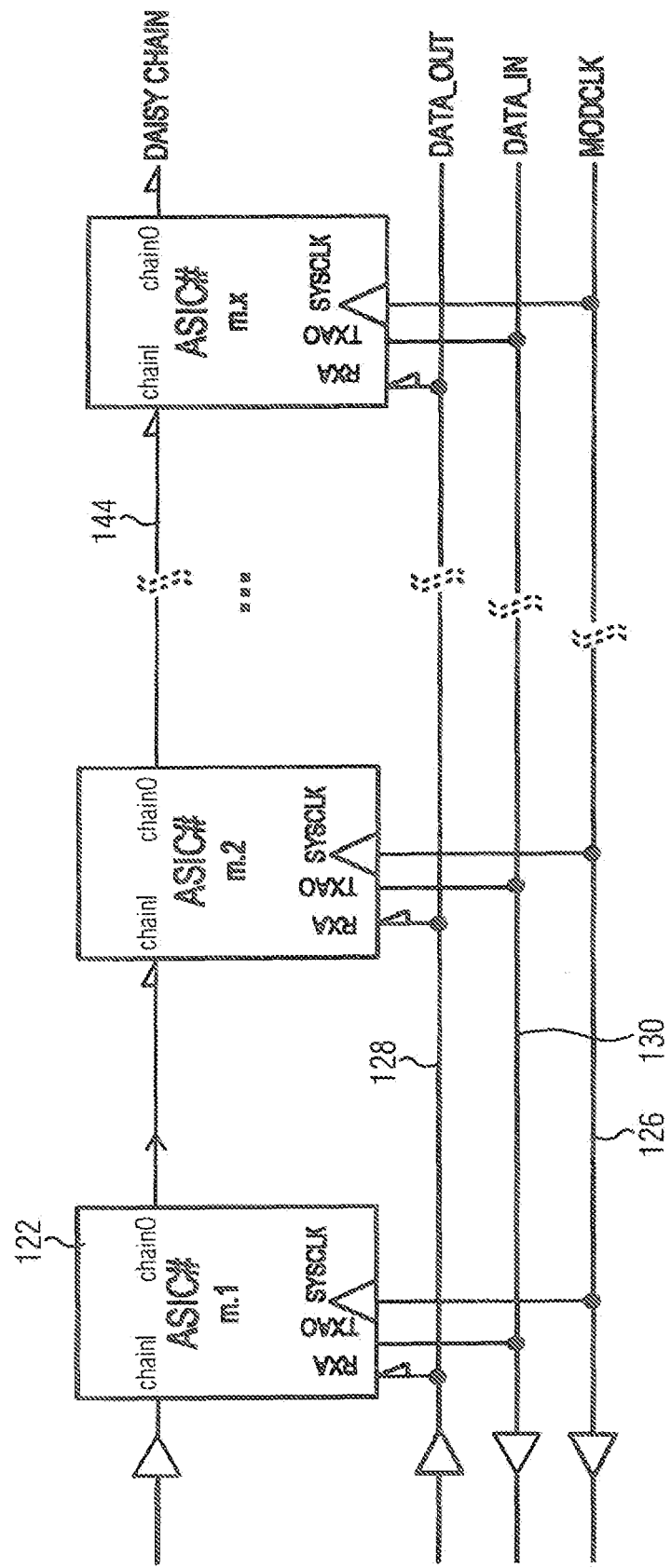
FIG. 10 shows a schematic representation of a serial connection for allocation of addresses according to a first embodiment.

FIG. 10 schematically illustrates an alternative daisy chain connection for passing on the address information. According to this embodiment, a plurality of control elements is connected by a three-fold bus line 124 which comprises again the data-out line 128 for receiving commands from a controller and a data-in line 130 for sending data towards the controller. Furthermore, the system clock is transmitted on clock line 126. In contrast to the embodiment shown in FIGS. 5 and 6, however, the data-in line 130 is also a parallel connection from where the connection to each control element 122 is branched off. The daisy chain connection for allocating the addresses according to the embodiment shown in FIG. 10 is a separate daisy chain interconnection 144.

Based on the arrangement shown in FIG. 8, now the procedure for allocating the individual addresses to each control element 122 (corresponding to an optoelectronic component 116 associated therewith) will be explained with reference to FIGS. 8 to 13.

Figure 11:
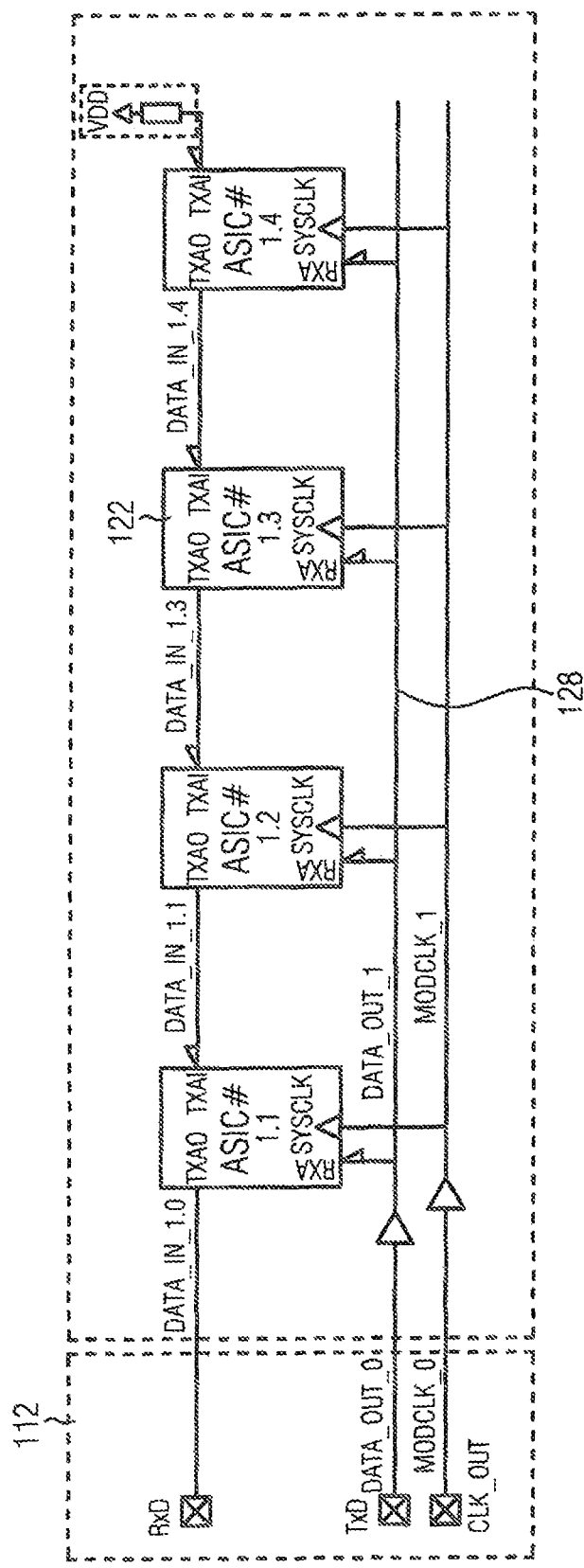
FIG. 11 shows a schematic representation of the serial connection for address allocation according to a second embodiment at the beginning of the process.

FIG. 11 shows the situation, where the setup is installed and the address allocation is about to begin.

During normal operation, the microcontroller which is present in the controller module 112, but not shown in detail in the figures, addresses each ASIC by inserting its corresponding node address into the command packet. Each ASIC is identified by its address which is loaded into the node address registers. Due to safety reasons, for answers from the ASIC 122 to the microcontroller 112, the ASIC uses the inverted node address, which will be called node identifier in the following. Hence, during normal operation the microcontroller will communicate with each ASIC using its unique node address and when the ASIC needs to transmit data to the microcontroller, the ASIC uses the node identifier. According to one particular embodiment, the ASIC farthest away from the microcontroller has the highest priority. However, this is only a question of definition and any of the other ASICs 122 may also be chosen to have highest priority.

A broadcast command can be sent with the broadcast address and all connected ASICs will execute the broadcast command. The ASICs will respond with their unique node identifier and the ASIC with the highest priority will win an arbitration phase and the microcontroller only receives the answer from this ASIC. The highest priority is defined by the position on the bus.

Referring now to FIG. 11, the TXAI terminal of each ASIC 122 has internally controllable pull-up devices. These are used for address allocation. After reset, the pull-ups are activated and each ASIC 122 drives its TXAO pin low until it receives a valid address. Because the TXAI terminal of the ASIC at the end of the line (in this case ASIC number 1.4) is not connected to the TXAO terminal of another ASIC, the pull-up will result in TXAI being high. Hence, after power-up, this is the only ASIC with its input TXAI being high. In the stage shown in FIG. 11, each of the ASICs may have a node address which is the default broadcast address.

For setting the first address (see FIG. 12), the microcontroller sends a first set address command on the data-out line 128. Each ASIC 122 receives this command, but only the ASIC number 1.4 detects the valid condition of a high-level on its TXAI pin and the default value in the node address. This means that no valid address is stored therein. Consequently, the ASIC will now store the logical node address "4" in its register. After the ASIC has stored the address, the ASIC will drive the TXAO pin high. The ASIC number 4 now has a valid address and the TXAI pin is in idle mode. Now ASIC number 4 has left the start-up mode and is idle, waiting for commands. This is symbolized in FIG. 12 by the enlarged line thickness of the ASIC's boundary.

After a pre-determined time span, the microcontroller sends another set address command on the data-out line 128. In this case, ASIC number 1.3 detects a high level on its TXAI pin and will store the address "3" in its node address registers. The microcontroller will now set the ASIC configuration bits to above a function with no pull-up. This will allow the TXAO pin to drive high. After the ASIC number 1.3 has stored the address, the ASIC will drive its TXAO pin high. The ASIC now has a valid address and the TXAI pin is in idle mode. Now the ASIC number 1.3 has left the start-up mode and is idle, waiting for commands, as is symbolized in FIG. 13 by the enlarged line thickness of ASIC number 1.3.

Figure 12:
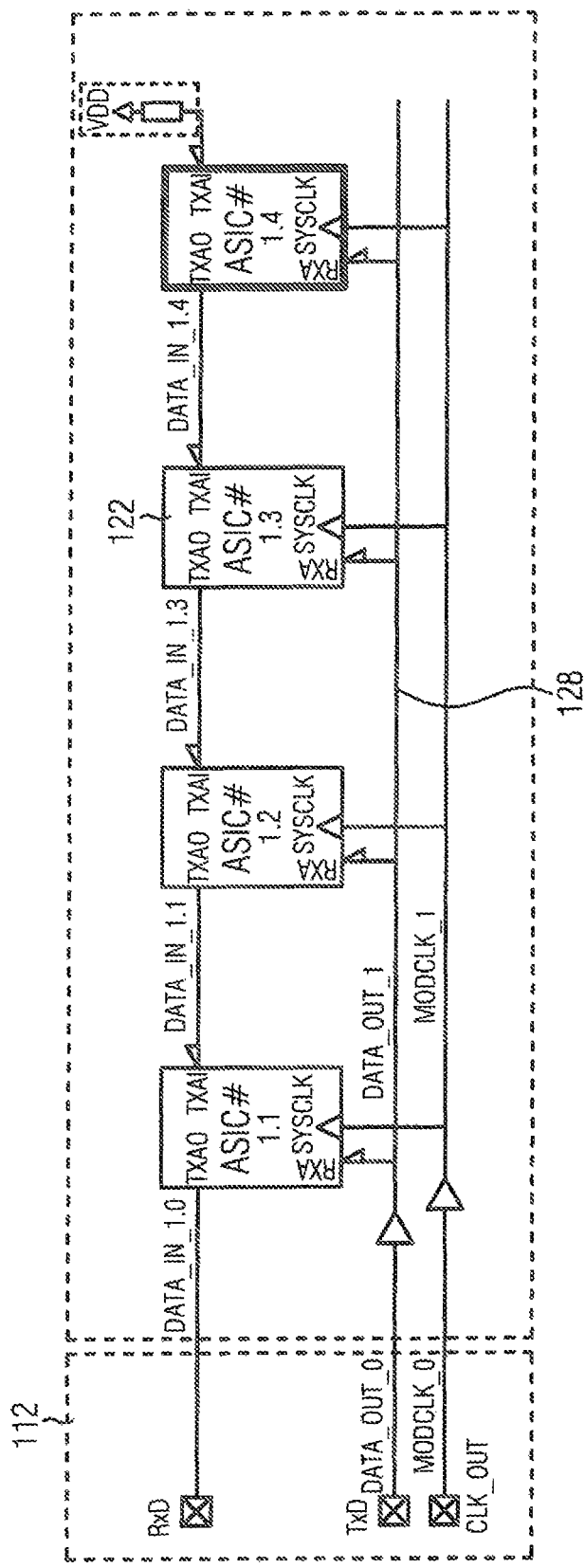
FIG. 12 shows a schematic representation of the serial connection for address allocation according to a second embodiment at a later instant.
Figure 13:
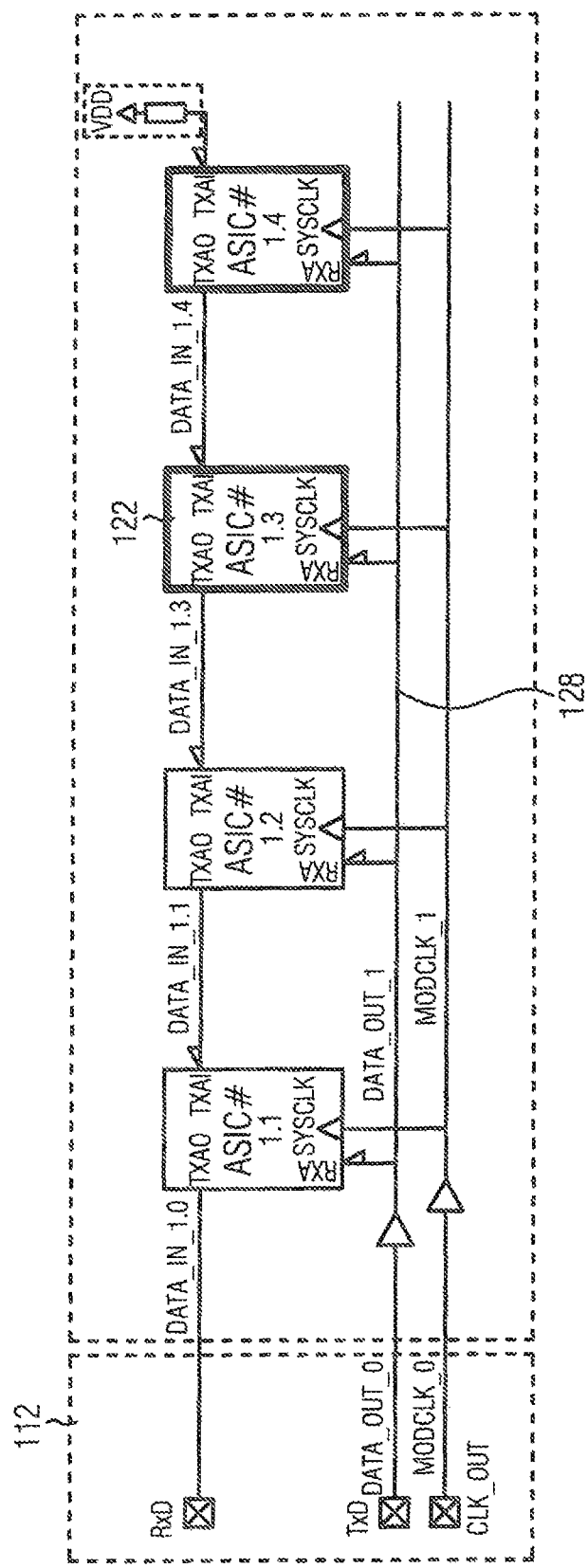
FIG. 13 shows a schematic representation of the serial connection for address allocation according to a second embodiment at a later instant.
Figure 14:
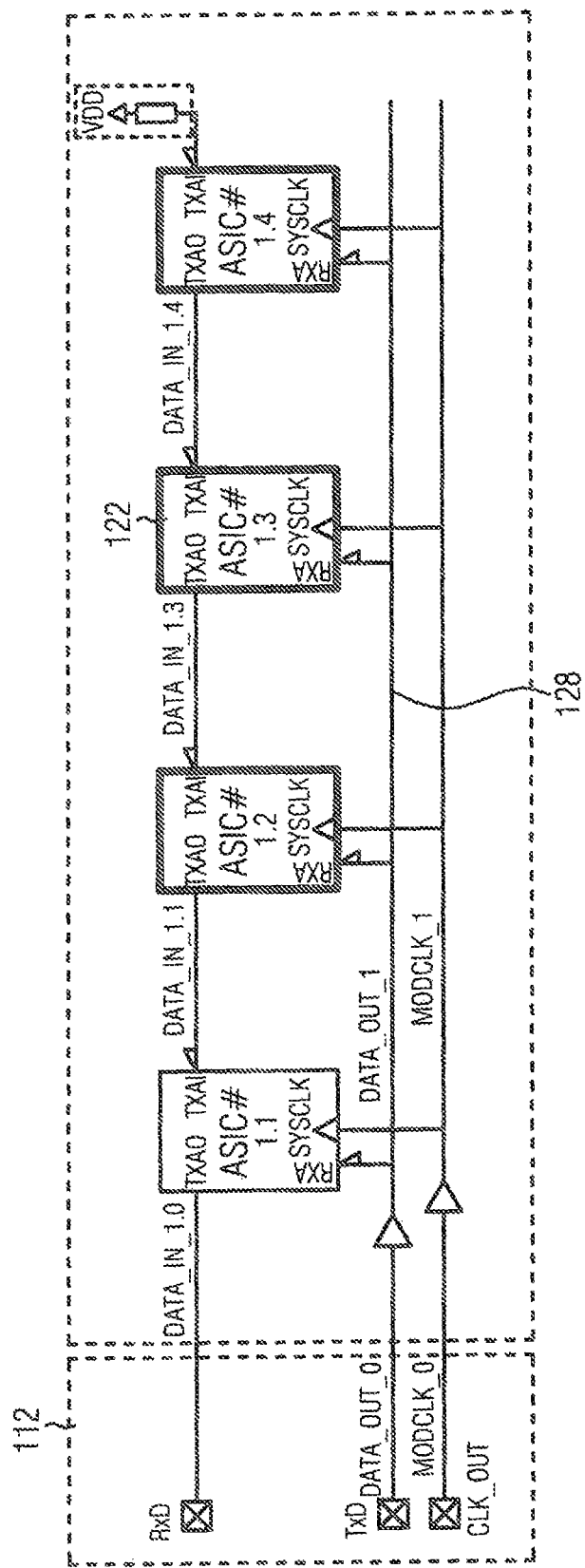
FIG. 14 shows a schematic representation of the serial connection for address allocation according to a second embodiment at a later instant.

The ASIC number 1.4 will always ignore this and any subsequent set address command, because it is no longer in the address mode. FIGS. 11 and 12 show the equivalent steps for the remaining ASICs.

Figure 15:
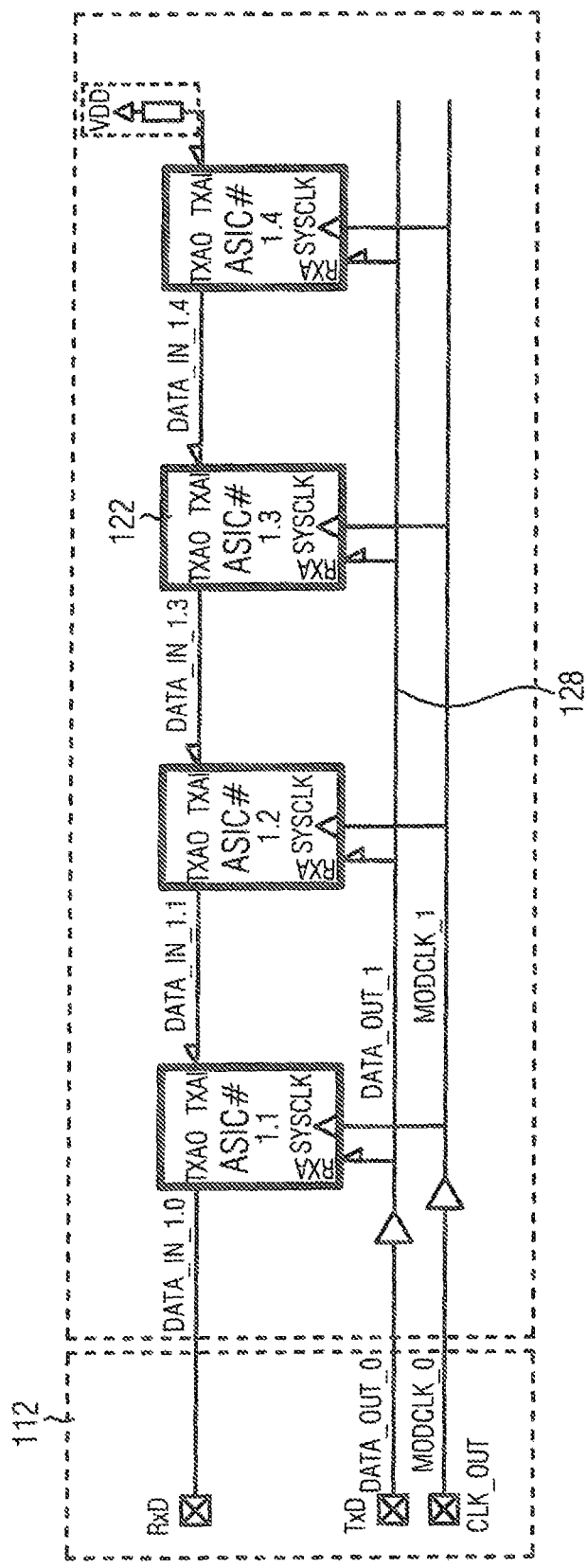
FIG. 15 shows a schematic representation of the serial connection for address allocation according to a second embodiment at a later instant.

FIG. 15 shows the situation when all ASICs 1.1 to 1.4 have been assigned their address, which is indicative of their position within the line, and are waiting for commands as indicated by their enlarged line thicknesses.

Figure 16:
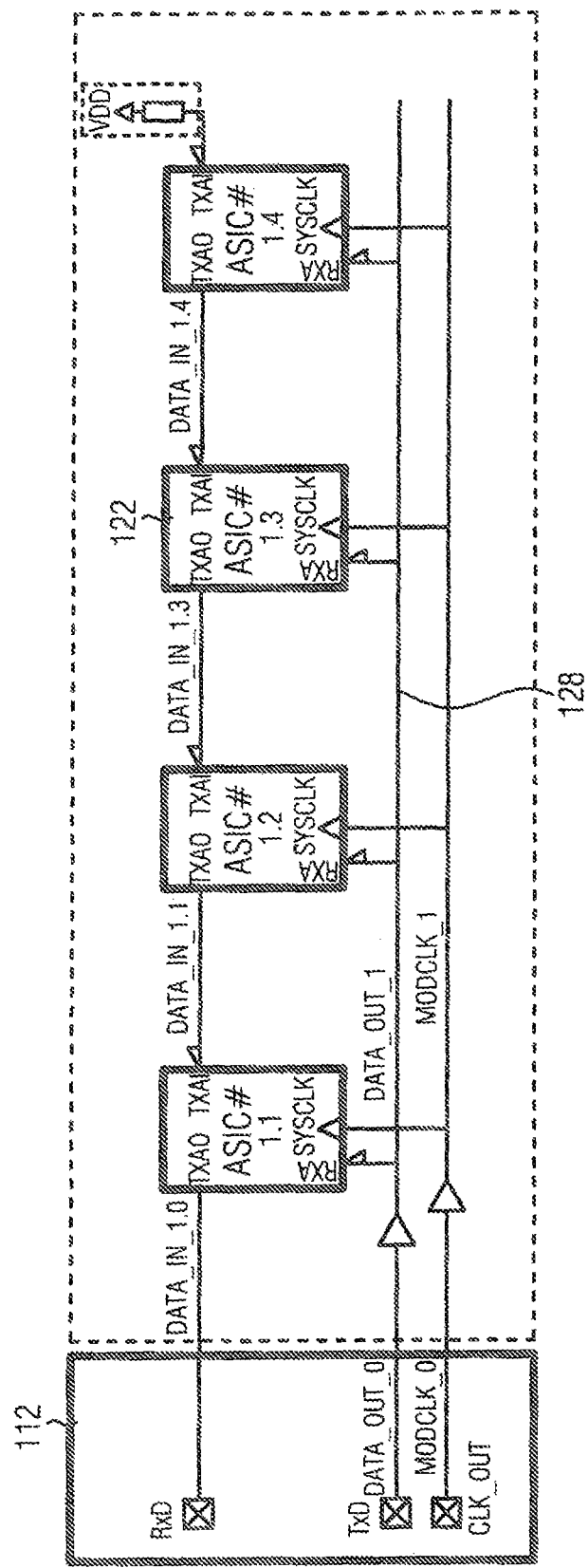
FIG. 16 shows a schematic representation of the serial connection for address allocation according to a second embodiment in the final state.

The final set is shown in FIG. 16. After all the ASIC's addresses are allocated, the first ASIC number 1.1, which is next to the microcontroller 112, will be in buffer function and will set its TXAO pin to a static high, i.e. idle level. This signal indicates to the microcontroller that all the ASICs are addressed and the microcontroller stores this information as a ready state (symbolized by the thick line delimitating the block of the control module 112).

Figure 17:
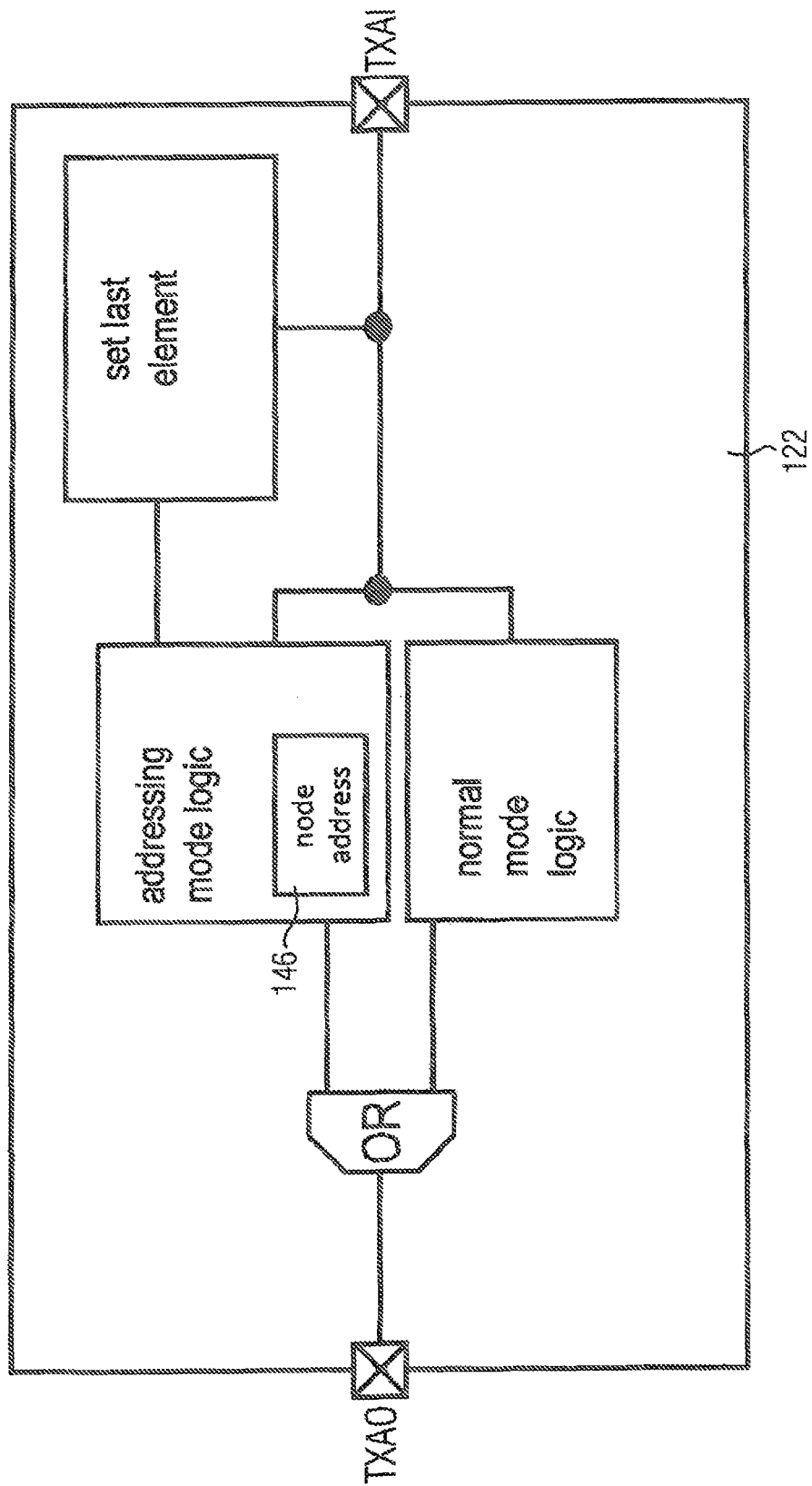
FIG. 17 a schematic representation of the conceptual internal circuitry for determining the operational status of the electronic circuit of an optoelectronic component.
Figure 18:
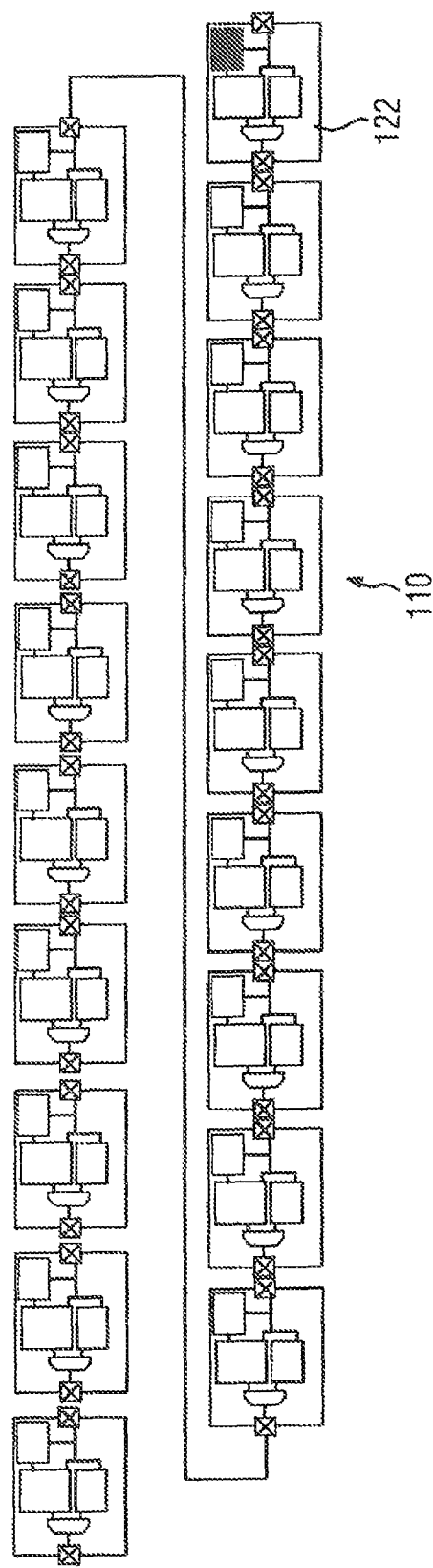
FIG. 18 shows a schematic representation of an optical unit formed by two serially connected optical modules.

FIG. 17 shows in the form of a conceptual circuitry the logic connection between the input terminal TXAI and the output terminal TXAO for each ASIC 122. According to the present invention, each ASIC 122 in a system will reset to an identical state. The default state enables the internal pull-up on TXAI and drives the TXAO low. Each ASIC will accept only set address commands and reset commands at this point. All other direct or broadcast commands will be ignored. Each ASIC will only perform the setting of the address if it firstly does not have an address from a prior set address command already and secondly has its own TXAI line high. In a network with all ASICs connected from TXAI to TXAO as shown in FIG. 18, immediately after reset the only ASIC with a high level at its TXAI input terminal will be the last one that has TXAI not driven by a subsequent ASIC 122. As symbolized by the OR connection, the output TXAO is driven high either during the addressing sequence by the addressing mode logic or by the normal mode logic during regular operation. Furthermore, the addressing mode logic contains an address field 146, where the address of the ASIC 122 is stored.

The addressing procedure is illustrated in FIGS. 16 to 18 using the logic circuit structure shown in FIG. 17 for each of the interconnected control units 122. As an example, two optical modules 110 are shown, each comprising a plurality of preferably identical control elements 122 (referred to as ASICs in the following). According to the present invention, the ASICs 122 are daisy chained for the addressing process. As already mentioned, this connection between the TXAI and TXAO terminals of the ASICs 122 can either be the data-out line, as shown in FIG. 8, or a separate addressing line 144, as this was explained with reference to FIG. 10.

Figure 19:
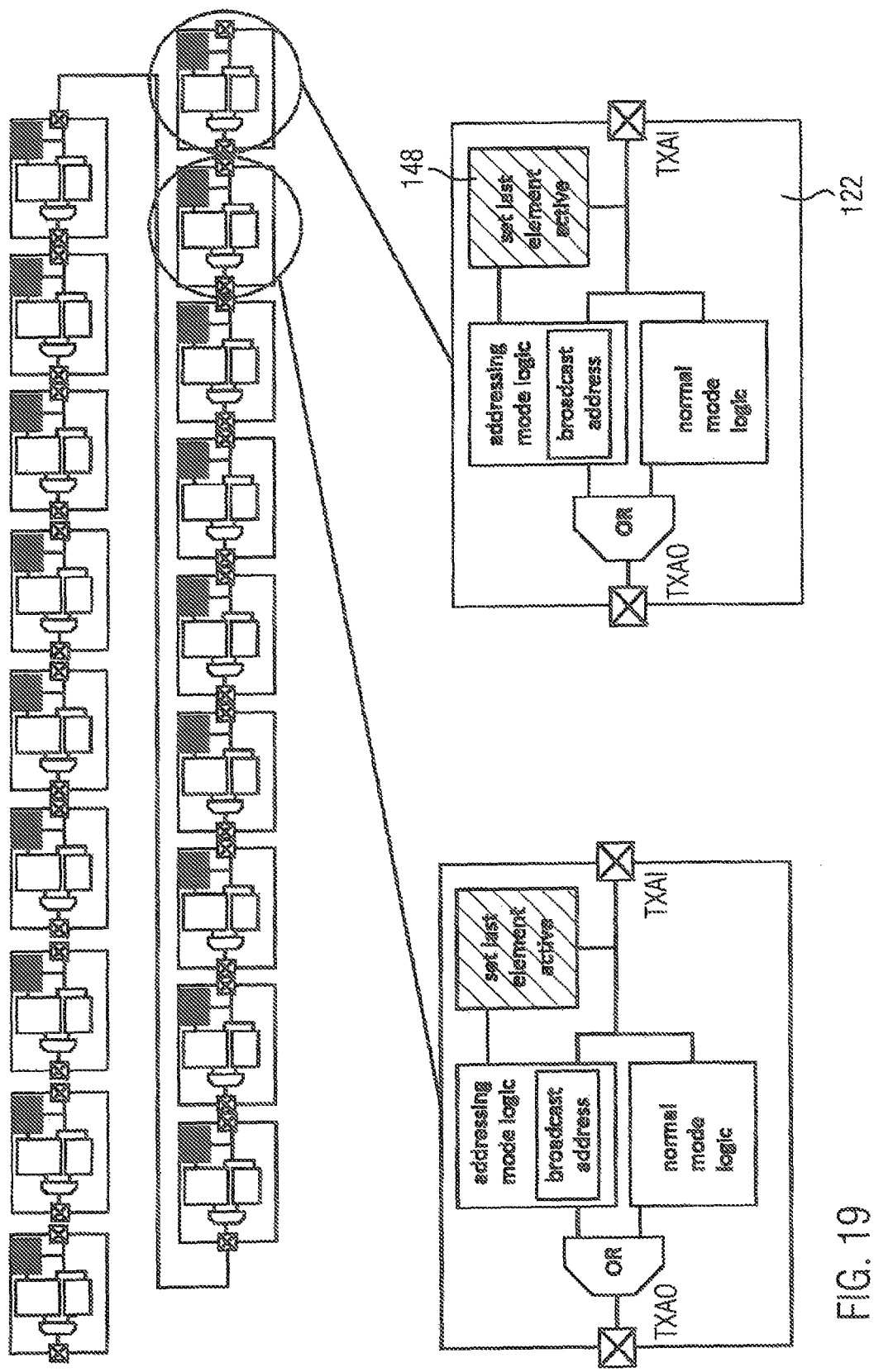
FIG. 19 shows a detail of the reset state for the last two nodes in the system shown in FIG. 18.
Figure 20:
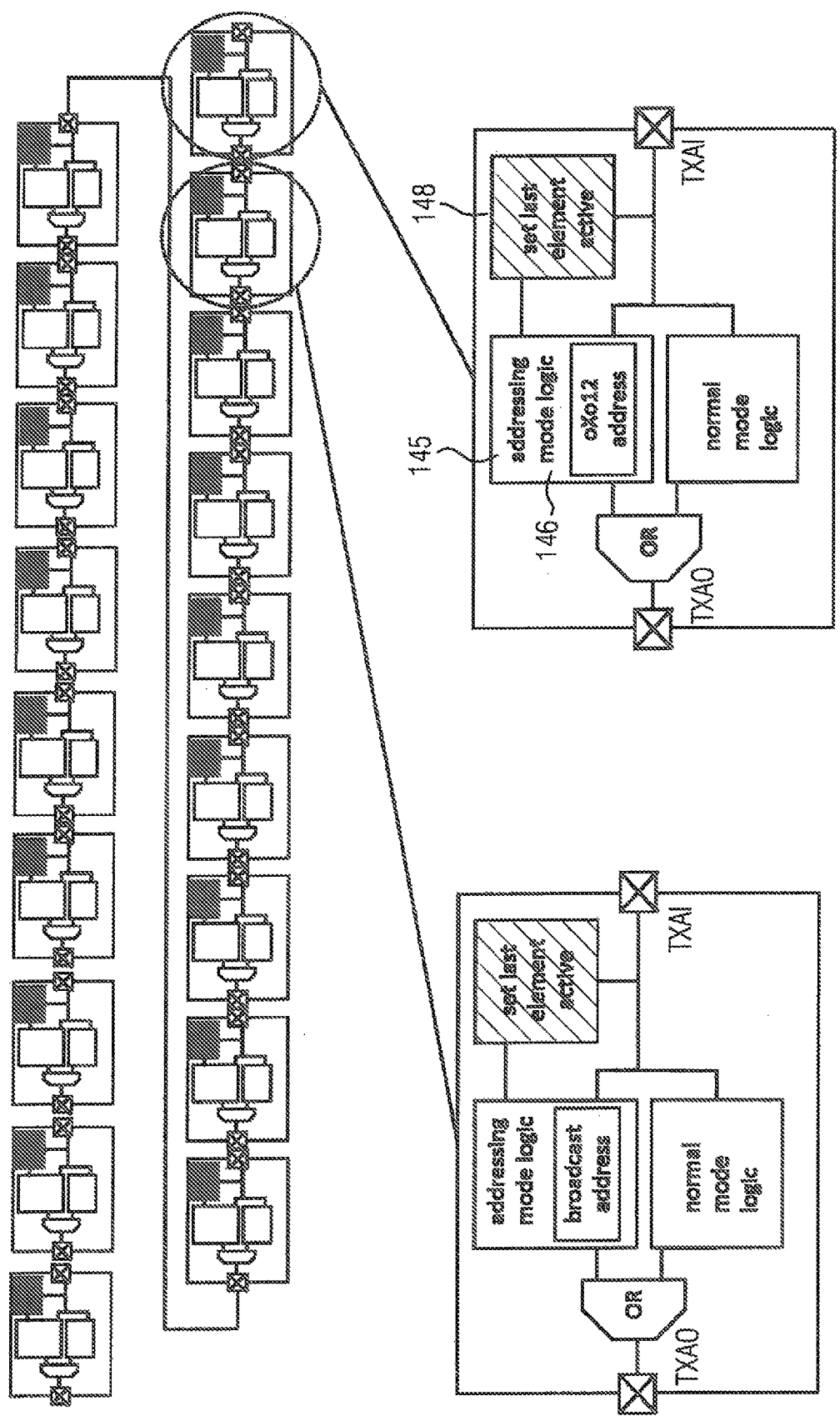
FIG. 20 shows a schematic representation of the system of FIG. 18 for explaining the set address operation.
Figure 21:
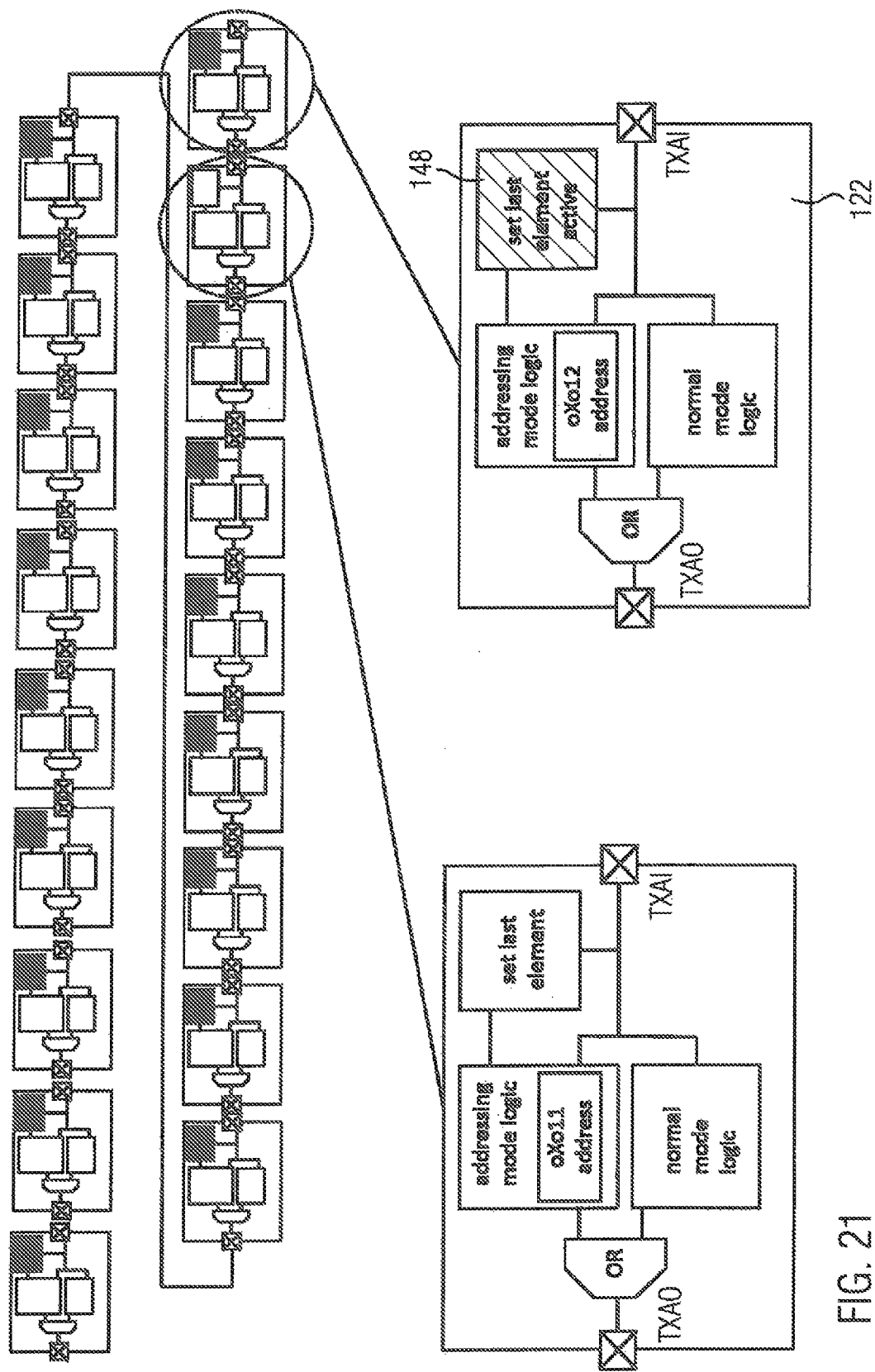
FIG. 21 shows a schematic representation of the operation where the following integrated circuit accepts the set address command and propagates the address enable.

FIG. 19 shows the situation, where each of the control elements 122 is in the reset mode and the last element is set active. The addressing mode logic in this configuration uses the broadcast address in the address field 146. In the reset mode, the ASICs closer to the microcontroller than the last one, have their TXAI input terminal driven to "0" by the previous ASIC 122. This is due to the filet that until the node address is set to another address than the broadcast address, the ASICs always drive their output TXAO to "0". The last ASIC on the bus has its input terminal left hanging, which therefore becomes "1" due to the internal pull-up 148.

The addressing mode logic 145 of the last ASIC 122 now sets the address field 146 to a value different from the broadcast address. The fact that the addressing mode logic now has an address different from the broadcast address in the address field 146, leads to an output signal of logical "1" at TXAO, which in turn is passed on to the input TXAI of the next following ASIC 122, allowing this ASIC to take the next set address command. Accordingly, the enable for the set address command is passed from ASIC to ASIC from the end of the daisy chain path to the microcontroller. In the course of this addressing each of the control elements 122 gets its address set according to its position within the sequential row of control elements 122. Each of the control elements 122 in their turn accept the set address command, set their address accordingly and propagate the address enable to the next following control element 122.

Figure 22:
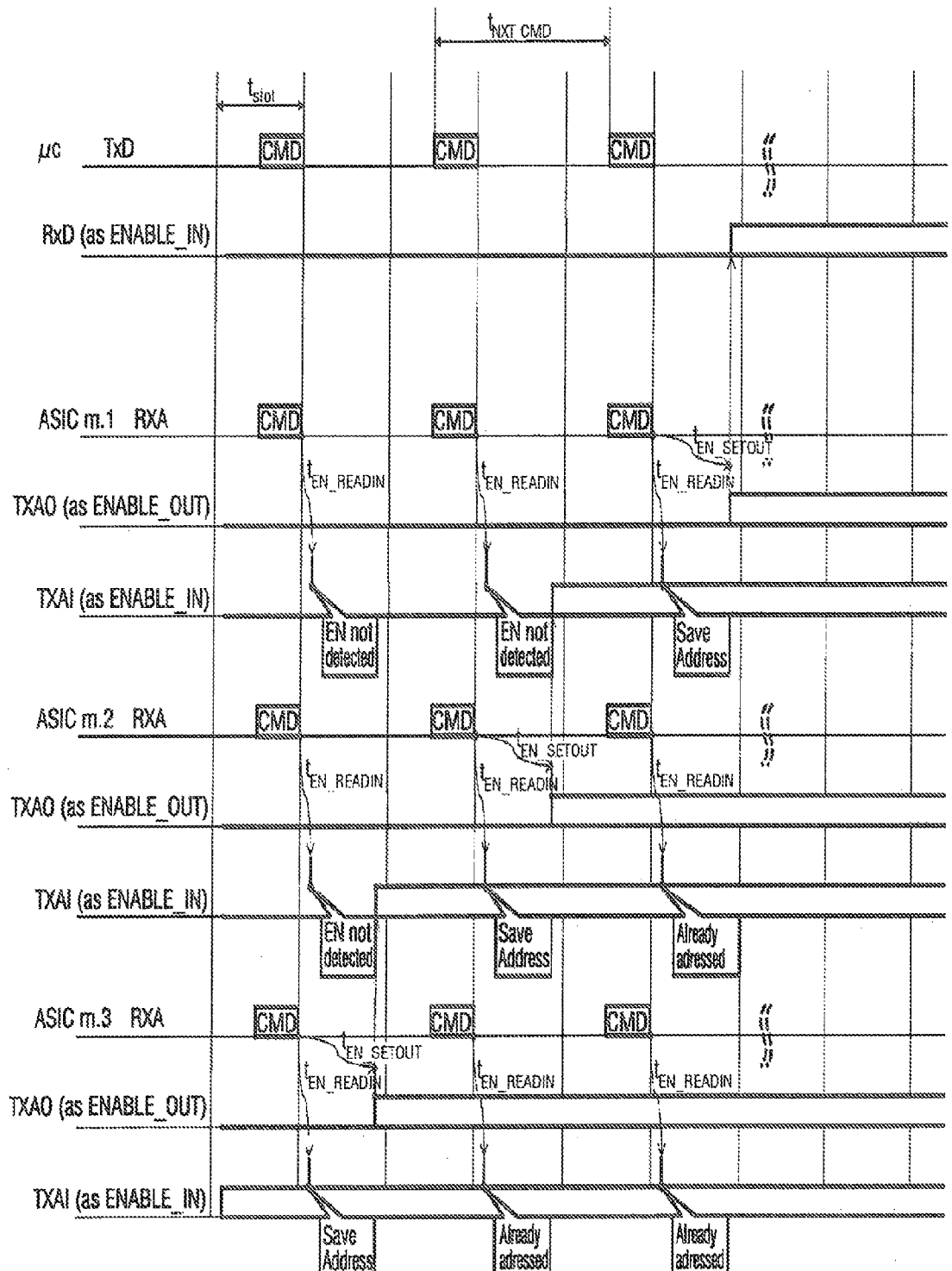
FIG. 22 shows a schematic tuning diagram for the address allocation procedure.

FIG. 22 gives a timing diagram for the data flow from the microcontroller towards the ASICs 122 and back again. According to this example, only three ASICs and their signals are given in FIG. 22 for the sake of clarity. In this particular case ASIC number m.3 is the last one. When the microcontroller transmits a set address command within the first time slot, ASIC m.1 finds that no enable signal has been detected and does not store an address.

ASIC m.2 equally does not find an enable signal and only the last ASIC m.3 has the enable signal and therefore the address is saved.

During the next clock period the next set address command is sent out and received. In this case, again, ASIC m.1 does not detect an enable and therefore does not save an address. ASIC number m.2 has the enable and saves the address. On the other hand, ASIC m.3 has already been addressed and therefore does not save an address.

In the last step, ASIC m.1 has already received the enable from ASIC m.2 and therefore saves the address when it receives a set address command from the microcontroller. The procedure is performed accordingly for any larger number of control elements and always starts with the last one in the serial row and finishes with the ASIC that is closest to the microcontroller.

After power-up, each ASIC completes the internal power-up sequence and then all the ASICs are ready for the address allocation procedure. Each ASIC drives its TXAO pin to a static low. Therefore, all ASICs, except the very last ASIC at the end of the series of ASICs, detect a static low at the TXAI pin. The very last ASIC, as already explained, has a static high level due to the internal pull-up resistor and due to the fact that no TXAO buffer drives it low. The microcontroller transmits the broadcast command set address to all connected ASICs. All ASICs interpret the received data. Only the very last ASIC (in the example shown in FIG. 22 ASIC m.3) detects a static high level at its TXAI pin after the time interval tEN_READIN. Therefore, this ASIC will store a received node address to its registers. Further information can also be stored in this ASIC at this moment.

Furthermore, a node identifier is set as a bit-wise inverted mirror of the node address. The condition of accepting the set address command is that the ASIC is in the address mode and has a high level on the TXAI pin. Once the node address and possible other data have been set, the configuration bits will be changed to a buffer function, which will cause the TXAO pin to drive high to the next ASIC, or in case of the first ASIC, to the microcontroller. After a time t NXT_CMD has lapsed, the microcontroller sends the next set address command to all ASICs requiring to set an address with a value reduced by one. In this case, the very last ASIC will refuse this and all later set address commands, regardless of what address is required to be set, because this particular ASIC is no longer in the address mode. As already mentioned, ASIC number m.2 detects its TXAI pin in a static high, which is delivered by the ASIC number m.3, and will handle the set address command accordingly.

The set address command is a broadcast command from the bus master, the microcontroller, to the ASICs. The command contains the node address, which will be stored in the ASIC in its address field and may for instance be a 9 bit node. Furthermore, according to an advantageous improvement, the inverted value of this address may also be stored in the ASIC. At start-up, each ASIC needs to have its address set. The addressing has to be in exactly the same order as the physical positions of the ASICs in their application environment. Each ASIC must be in a default reset condition, where the node address is not stored and the TXAI pin must be at a high level in order to start the addressing procedure, as already mentioned above. The ASIC stores the transmitted parameter node address at the dedicated register address of its addressing mode logic. Afterwards, the ASIC reads the register, inverts the read value, and stores it at the dedicated register address for the parameter node identifier. Finally, the ASIC reads the node identifier from the registers and compares the read value with the value from the original command. This read-verify procedure is done to ensure that no errors occurred when storing the addresses to the registers.

Figure 23:
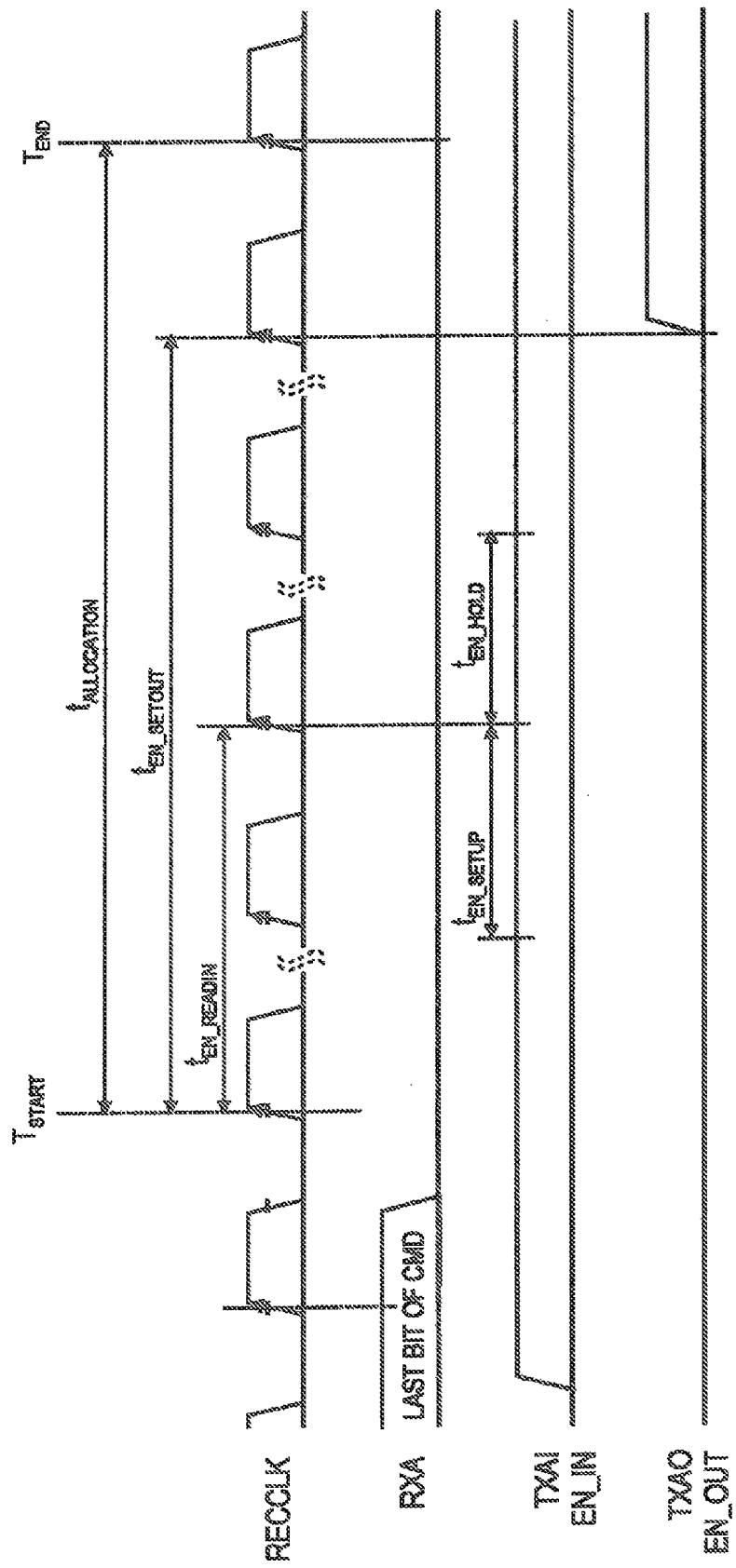
FIG. 23 shows a further timing diagram for the address allocation process.

FIG. 23 summarizes some important timing correlations for the various signals. In particular, the signal RECCLK gives the clock signal and TSTART defines the moment when the command is completely received. The time t EN_READIN signifies the time, when the TXAI pin will be read. Next, the time t EN_SETOUT is the time when the TXAO pin is set to a static high. The time t EN_SETUP defines how long the enable signal must be on a dedicated level, and the time t EN_hold defines how long the enable signal must be stable after being captured. The time t NXT_CMD defines the interval time when the microcontroller sends the next set address commands.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

| Reference Numerals | |
|---|---|
| Reference Numeral | Description |
| 100 | light curtain |
| 102 | first optical unit |
| 104 | second optical unit |
| 106 | first plug-in module |
| 108 | second plug-in module |
| 110, 310 | first optical module (without controller) |
| 210, 410 | optical module with only receivers |
| 210', 410' | optical module with only emitters |
| 112 | second optical module (with controller) |
| 114 | radiation beam |
| 116 | optoelectronic component |
| 118 | light emitting element |
| 120 | light receiving element |
| 122 | control element |
| 124 | communication bus |
| 126 | system clock |
| 128 | data-out |
| 130 | data-in |
| 132 | internal logic |
| 134 | amplifier |
| 136 | supply |
| 138 | emitter drive |
| 140 | clock |
| 142 | communication |
| 144 | daisy chain |
| 145 | addressing mode logic |
| 146 | address field |
| 148 | internal pull-up |

We claim:

1. An optical unit for a light curtain for monitoring a protective field, said optical unit comprising:
a controller module; and
a plurality of optoelectronic components interconnected by a communication bus, each of said optoelectronic components having a transmission input terminal for receiving a transmission signal, a transmission output terminal for outputting a transmission signal, and a receiving terminal for receiving a control signal from said controller module, wherein the communication bus includes:
a data out line from the controller module connected in parallel with each of the optoelectronic components, the data out line operable to transmit data from the controller module to each of the optoelectronic components, and
a data in line connected serially in a daisy chain configuration between each of the plurality of optoelectronic components and the controller module, and
wherein an individual address is allocated to each of said optoelectronic components depending on a position of the respective optoelectronic component with respect to the other optoelectronic components.

2. The optical unit of claim 1, wherein the optoelectronic components are connected to each other by at least one serial interconnection.

3. The optical unit of claim 2 further comprising at least one delay element for delaying signals transmitted on said serial interconnection.

4. The optical unit of claim 1, wherein each of said optoelectronic components includes at least one light emitting element and at least one light receiving element.

5. The optical unit of claim 4, wherein the emitted light is one of an infrared radiation having a wavelength between about 750 nm and 1500 nm and a visible light having a wavelength between about 400 nm and 750 nm.

6. The optical unit of claim 4, further comprising an electronic circuit for driving said at least one light emitting element and for processing signals generated by said at least one light receiving element.

7. The optical unit of claim 1, wherein each optoelectronic component includes one of a permanent memory and a volatile memory for storing the allocated individual address.

8. The optical unit of claim 1, wherein at least one first plurality of optoelectronic components and at least one second plurality of optoelectronic components are grouped to form at least two optoelectronic modules within said optical unit.

9. The optical unit of claim 1 further comprising a second plurality of optoelectronic components interconnected by a communication bus, each of said second plurality of optoelectronic components having a transmission input terminal for receiving a transmission signal, a transmission output terminal for outputting a transmission signal, and a receiving terminal for receiving a control signal from said control unit, wherein:
each of said plurality of optoelectronic components includes at least one light emitting element and at least one light receiving element,
each of said second plurality of optoelectronic components includes at least one light emitting element and at least one light receiving element,
the plurality of optoelectronic components and the second plurality of optoelectronic components are positioned opposing each other, and
the light emitting elements and the light receiving elements are provided to form a light grid from a plurality of light barriers formed between opposing light emitting elements and light receiving elements.

10. A method for allocating an individual address to each of a plurality of optoelectronic components connected to each other via a communication bus, wherein the communication bus includes a data out line from a controller module connected in parallel with each of the optoelectronic components and a data in line connected serially in a daisy chain configuration between each of the plurality of optoelectronic components, said method comprising the following steps:

from the controller module, broadcasting a request to all optoelectronic components via the data out line in a first communication direction;

from each of the optoelectronic components, transmitting an individual response to the controller via the data in line in a second communication direction; and allocating an individual address to each of the optoelectronic components depending on a position of the respective optoelectronic component with respect to the other optoelectronic components.

11. The method of claim 10, wherein the first and second communication directions are opposed to each other.

12. The method of claim 10, wherein said optoelectronic components are connected to each other by at least one serial interconnection.

13. The method of claim 10, wherein during a set-up mode the individual addresses are allocated and stored in a permanent memory in each optoelectronic component.

14. The method of claim 10, wherein during a set-up mode the individual addresses are allocated and stored in a volatile memory in each optoelectronic component.

15. The method of claim 10, wherein each optoelectronic component has a unique identifier stored therein which is read out and correlated with the position of the respective optoelectronic component with respect to the other optoelectronic components for forming the individual address.

16. The method of claim 15, wherein said unique identifier is stored in each optoelectronic component during manufacture of the optoelectronic component or when assembling a group of the optoelectronic components.

17. The method of claim 10, wherein said controller module is operable to access each of the optoelectronic components randomly via said communication bus using the allocated addresses as node addresses.

18. The method of claim 10 further comprising the steps of:
calculating an inverted value of the allocated address for each of the optoelectronic components; and
storing the inverted value of the allocated address in each of the optoelectronic components.

19. The method of claim 18, wherein the controller module addresses each optoelectronic component using the individual address and wherein each of the optoelectronic components use the inverted value of the allocated address to communicate with the controller module.

20. The method of claim 10, wherein the optoelectronic component located farthest away from or nearest to the controller module has the highest priority.

* * * * *